United States Patent
Watarai

(10) Patent No.: US 9,105,089 B2
(45) Date of Patent: Aug. 11, 2015

(54) IMAGE PROCESSOR, IMAGE PICKUP APPARATUS, IMAGE PICKUP SYSTEM AND DATA PROCESSING METHOD

(75) Inventor: Yuji Watarai, Nagoya (JP)

(73) Assignee: SOCIONEXT INC., Yokohama (JP)

(*) Notice: Subject to any disclaimer, the term of this patent is extended or adjusted under 35 U.S.C. 154(b) by 364 days.

(21) Appl. No.: 13/568,404

(22) Filed: Aug. 7, 2012

(65) Prior Publication Data

US 2013/0038754 A1    Feb. 14, 2013

(30) Foreign Application Priority Data

Aug. 8, 2011    (JP) ................ 2011-173232

(51) Int. Cl.
| | |
|---|---|
| H04N 5/335 | (2011.01) |
| H04N 5/76 | (2006.01) |
| G06K 9/00 | (2006.01) |
| G06T 5/00 | (2006.01) |
| H04N 9/04 | (2006.01) |
| H04N 5/77 | (2006.01) |
| H04N 5/782 | (2006.01) |
| G06K 9/20 | (2006.01) |
| G06K 9/32 | (2006.01) |
| G06T 5/50 | (2006.01) |

(52) U.S. Cl.
CPC ............ *G06T 5/005* (2013.01); *G06K 9/00825* (2013.01); *G06K 9/2018* (2013.01); *G06K 9/3241* (2013.01); *G06T 5/50* (2013.01); *H04N 5/77* (2013.01); *H04N 5/782* (2013.01); *H04N 9/045* (2013.01); *G06T 2207/10016* (2013.01); *G06T 2207/10024* (2013.01); *G06T 2207/30252* (2013.01)

(58) Field of Classification Search
USPC ............ 348/231.3, 208.99; 375/240.88
See application file for complete search history.

(56) References Cited

U.S. PATENT DOCUMENTS

2004/0101047 A1* 5/2004 Yang ................ 375/240.08
2007/0285521 A1* 12/2007 Watanabe et al. ........ 348/208.99

FOREIGN PATENT DOCUMENTS

| JP | 2005-301518 | 10/2005 |
| JP | 2008-288743 | 11/2008 |
| JP | 2009-278496 | 11/2009 |

* cited by examiner

*Primary Examiner* — Roberto Velez
*Assistant Examiner* — Stephen Coleman
(74) *Attorney, Agent, or Firm* — Westerman, Hattori, Daniels & Adrian, LLP

(57) ABSTRACT

An image processor includes an extracting unit and a synthesizer. The extracting unit extracts partial image data corresponding to a set color from pickup image data of first to (N−1)-th frames of the first to N-th frames output from an image pickup unit within one video recording cycle. The extracting unit estimates a region-to-be-extracted based on a color of a pixel from pixels constituting the first to (N−1)-th frames, stores pixel values of pixels included in the estimated region-to-be-extracted, determines validity of the estimated region-to-be-extracted, and stores, in a storage unit, region information of the region-to-be-extracted that is determined as being validated. The synthesizer synthesizes the pixels of the region-to-be-extracted and the pickup image data of the N-th frame based on the region information to generate and output an output frame.

16 Claims, 12 Drawing Sheets

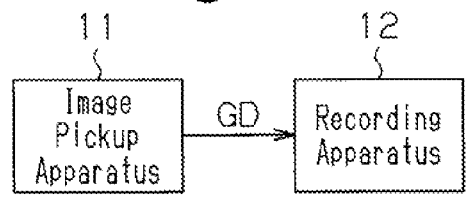
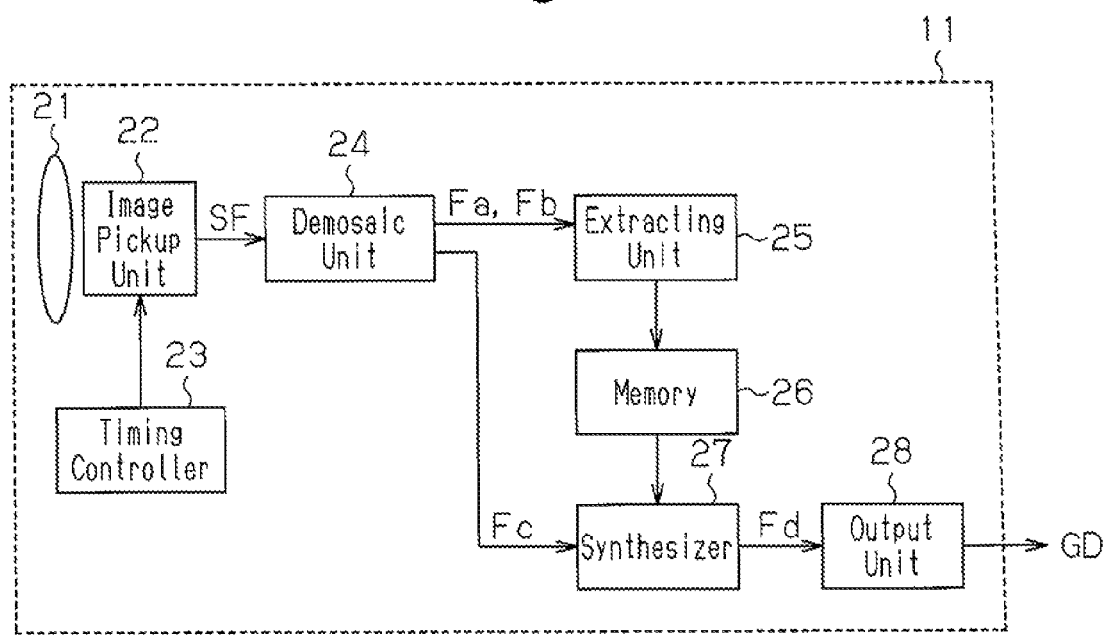
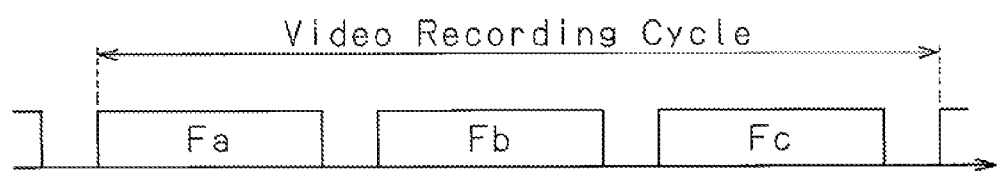

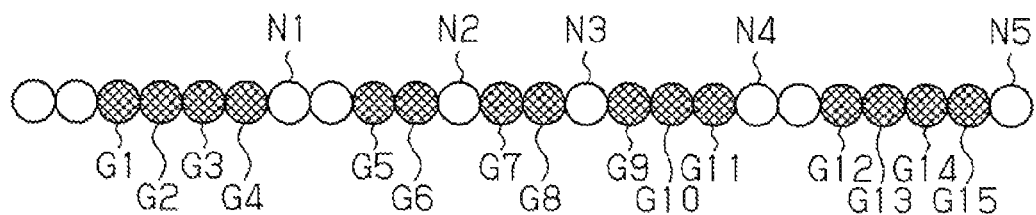
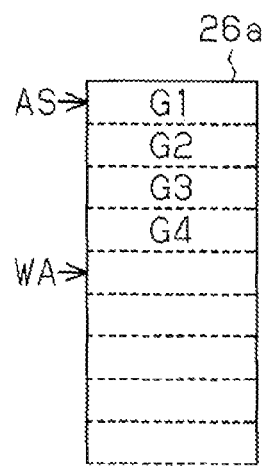 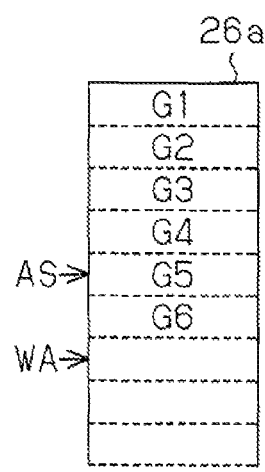 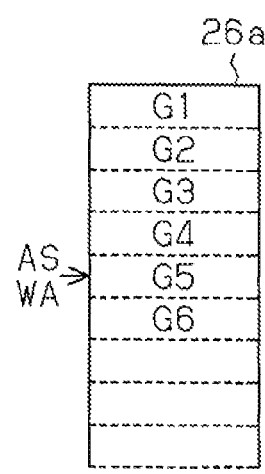
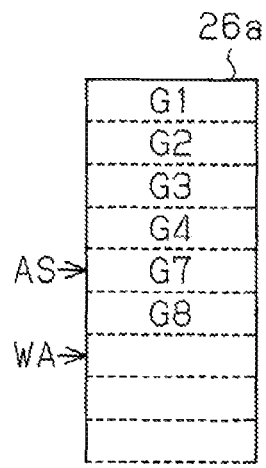 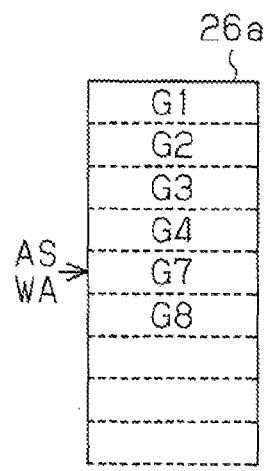 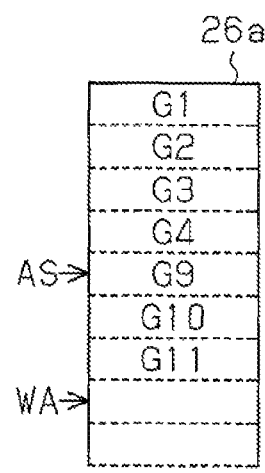

IMAGE PROCESSOR, IMAGE PICKUP APPARATUS, IMAGE PICKUP SYSTEM AND DATA PROCESSING METHOD

CROSS-REFERENCE TO RELATED APPLICATIONS

This application is based upon and claims the benefit of priority from prior Japanese Patent Application No. 2011-173232, filed on Aug. 8, 2011, the entire contents of which are incorporated herein by reference.

FIELD

The embodiments discussed herein are related to an image processor, an image pickup apparatus, an image pickup system and a data processing method.

BACKGROUND

Conventionally, there has been proposed a recording apparatus, or an on-board drive recorder which videotapes a peripheral situation of a vehicle by a camera mounted on the vehicle, and which records the videotaped image information. An image recorded by the drive recorder is utilized for tracking down a cause of an accident when the accident occurs, or is utilized for safe driving education for drivers.

As the peripheral situation a traffic light (traffic signal) may be captured by the camera mounted on the vehicle. Recent traffic lights use light emitting diodes (LEDs) in the light displaying portions. The LED traffic light is advantageous in terms of power consumption and lifetime. When a light displaying portion of a LED traffic light displays light of a color, the LEDs of the light displaying portion are driven by a commercial alternating (AC) power supply for example, and repeat lighting and non-lighting at frequency of the AC power supply of the commercial power supply. The flashing of the LEDs in the light displaying portion may not be recognized by a human with the naked eye. The drive recorder records a videotaped image at a constant recording rate such as 30 frames/second, for example. Depending upon conditions of a camera device of the drive recorder, despite the fact that it seems a light displaying portion of a LED traffic light displays light of a color by the naked eye, an image of the LED traffic light in which all of the light displaying portions are turned off is recorded in some cases.

There have been proposed various types of apparatuses which videotape a traffic light in its lighting state. For example Japanese Laid-Open Patent Publication No. 2009-278496 proposes an apparatus which videotapes with timing deviated from a cycle of a power supply of a traffic light. Japanese Laid-Open Patent Publication No. 2008-288743 proposes an apparatus which videotapes with exposure time which is adjusted longer than a flashing cycle of LEDs. Japanese Laid-Open Patent Publication No. 2005-301518 proposes an apparatus which videotapes with cycle which is not in synchronization with the flashing cycle of LEDs.

SUMMARY

However, in the apparatus which videotapes with timing deviated from a cycle of a power supply of a traffic light, it is necessary to obtain the cycle of the power supply, and it is difficult to control the videotaping timing. In the apparatus which videotapes with exposure time which is adjusted longer than a flashing cycle of LEDs, control of shutter etc. becomes complicated. An image videotaped with a cycle which is not in synchronization with the flashing cycle of LEDs has a videotaping cycle which is different from that of a general camera device. Therefore, when the image is played back, a viewer feels strangeness in some cases, and a special display device or conversion device is required for playing back the image.

According to an aspect of the embodiments, an image processor includes an extracting unit that extracts partial image data corresponding to a set color from pickup image data of first to (N−1)-th frames of the first to N-th frames output from an image pickup unit within one video recording cycle, where N is an integer not less than two. A storage unit is coupled to the extracting unit and store the extracted partial image data. A synthesizer is coupled to the storage unit and synthesizes pickup image data of the N-th frame and the partial image data read from the storage unit to generate an output frame, and outputs image data of the output frame. The extracting unit estimates a region-to-be-extracted based on a color of a pixel from pixels constituting the first to (N−1)-th frames, stores pixel values of pixels included in the estimated region-to-be-extracted in the storage unit, determines validity of the estimated region-to-be-extracted, and stores, in the storage unit, region information of the region-to-be-extracted that is determined as being validated. The synthesizer synthesizes the pixels of the region-to-be-extracted and the pickup image data of the N-th frame based on the region information to generate the output frame.

The object and advantages of the invention will be realized and attained by means of the elements and combinations of particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a schematic diagram of a system;

FIG. 2 is a block diagram of an image pickup apparatus according to a first embodiment;

FIG. 3 is an explanatory diagram of an extraction frame and a synthesis frame;

FIG. 14 is an explanatory diagram illustrating a row of pixels after a region is determined;

FIGS. 15A to 15F are explanatory diagrams of address control;

DESCRIPTION OF EMBODIMENTS

Figure 4:
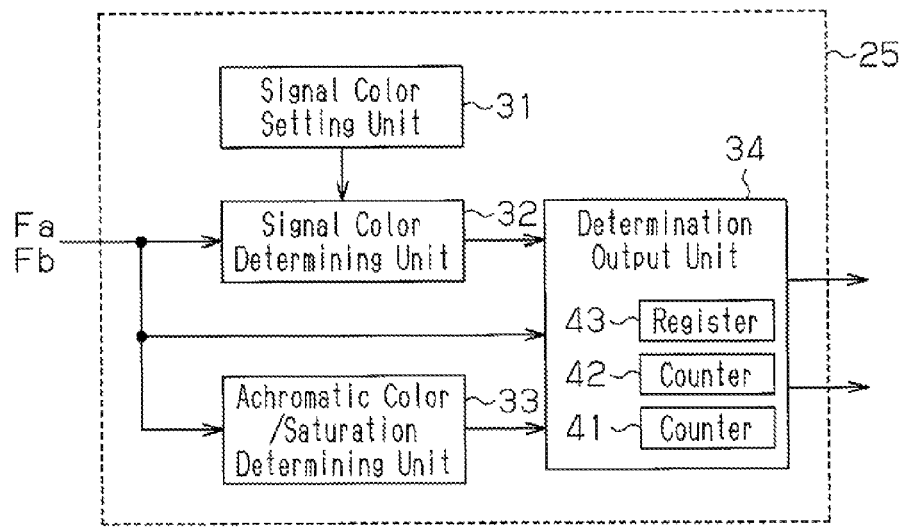
FIG. 4 is a block diagram of an extracting unit.

Embodiments of the present disclosure will be described in accordance with the attached drawings.

As illustrated in FIG. 1, a system of each of the embodiments includes an image pickup apparatus 11 and a recording apparatus 12. The system is provided in a vehicle, for example. The image pickup apparatus 11 videotapes a forward sight of the vehicle, and generates image data GD. The recording apparatus 12 records the image data GD supplied from the image pickup apparatus 11.

The image pickup apparatus 11 outputs each frame of image data with cycle corresponding to a certain standard (such as NTSC (National Television System Committee) standard). That is, the image pickup apparatus 11 outputs image data with the number of frames per unit time corresponding to a certain standard. For example, the image pickup apparatus 11 outputs image data of even-numbered and odd-numbered fields of one frame at frequency (e.g., 30 Hz) corresponding to the certain standard. The recording apparatus 12 records image data in a form complying with the standard corresponding to the image pickup apparatus 11. The form (the number of frame per unit time or frame rate) of image data corresponds to an ordinary moving image recording format. Image data recorded in the recording apparatus 12 may be displayed on a display device (e.g., NTSC display device) corresponding to a recording format of the recording apparatus 12. For example, the display device displays an image at a frame rate of 30 frames for one second (fps: frame per second). Image data recorded in the recording apparatus 12 includes frames with constant cycle. Therefore, since the time intervals between frames are constant, video bringing no feeling of strangeness may be obtained.

The image pickup apparatuses will be described sequentially.

As illustrated in FIG. 2, a lens 21 of the image pickup apparatus 11 forms a subject image on a light receiving surface of an image pickup unit 22. The image pickup unit 22 includes a color filter of a certain arrangement (e.g., Bayer arrangement), and an image pickup device including a plurality of pixels having a photoelectric convertor. A CCD (Charge Coupled Device) image sensor or a CMOS (Complementary Metal Oxide Semiconductor) image sensor is used as the image pickup device.

The image pickup unit 22 operates in accordance with a control signal supplied from a timing controller 23. The control signal includes a clock signal and a synchronizing signal (such as vertical synchronizing signal and horizontal synchronizing signal). The timing controller 23 generates a clock signal of a frequency corresponding to the above-described standard. For example, the timing controller 23 generates a clock signal of a frequency (e.g., 90 Hz) corresponding to an integral multiple (e.g., three times) of the number of frames (e.g., 30 fps) per the above-described unit time.

The image pickup unit 22 photoelectric converts a subject image in synchronization with a clock signal and generates pickup image data. The image pickup unit 22 outputs pickup image data SF of each frame in synchronization with a clock signal. In the case of the above-described example, the image pickup unit 22 outputs image pickup system of 90 frames (fps) in one second.

A demosaic unit 24 converts pickup image data SF which is output from the image pickup unit 22 into image data of certain format, and outputs the converted image data.

Figure 5A:
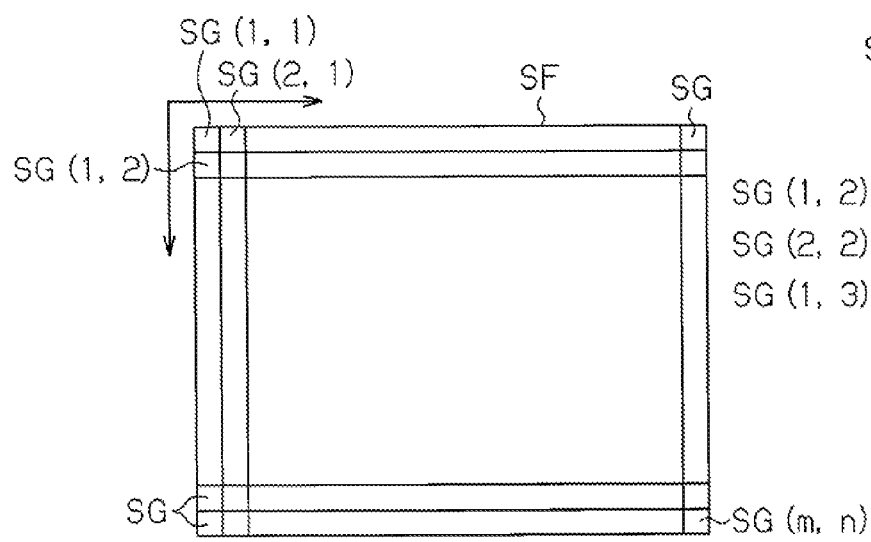
FIGS. 5A and 5B are explanatory diagrams of image data.

As illustrated in FIG. 5A, the pickup image data SF of one frame includes a plurality of pixel data SG. In FIG. 5A, the pixel data SG arranged in the lateral direction corresponds to a plurality of light receiving portions arranged in a first direction (e.g., horizontal direction) of the image pickup device. Pixel data SG arranged in the vertical direction in FIG. 5A corresponds to a plurality of light receiving portions arranged in a second direction (e.g., vertical direction) which intersects with the first direction of the image pickup device at right angles. Each pixel data SG includes a pixel value corresponding to an amount of light received by a corresponding light receiving portion. The light receiving portion of the image pickup device receives light which passes through a color filter of a certain arrangement (e.g., Bayer arrangement). Therefore, the pixel value included in the pixel data SG includes color information corresponding to arrangement and a color of a corresponding color filter.

For example, pixel data sets are distinguished from one another by expressing the pixel data as SG(x,y) in accordance with arrangement of the light receiving portions, where x indicates arrangement order in the first direction, and y indicates arrangement order in the second direction. For example, in FIG. 5A, upper left pixel data is denoted as SG(1, 1). Pixel data on the right side of the pixel data SG(1, 1) is denoted as SG(2, 1), and pixel data located immediately below the pixel data SG(1, 1) is denoted as SG(1, 2). In FIG. 5A, lower right pixel data is denoted as SG(m, n). Here, m indicates the number of light receiving portions arranged in the first direction, and n indicates the number of light receiving portions arranged in the second direction.

Each pixel data SG includes color information corresponding to a color of a corresponding color filter. For example, a color filter of the Bayer arrangement includes a red (R) filter, a green (G) filter and a blue (B) filter. Therefore, the image pickup device SF includes a plurality of pixel data SG, and each pixel data SG includes color information of corresponding one color.

Figure 5B:
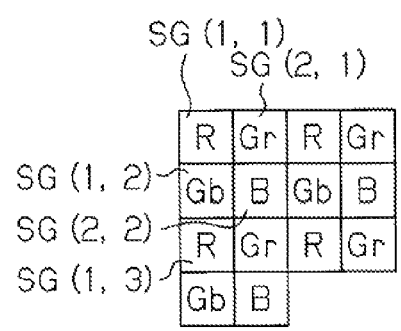

As illustrated in FIG. 5B, the pixel data SG(1, 1) includes red (R) color information, and the pixel data SG(2, 1) includes green (Gr) color information. The pixel data SG(1, 2) includes green (Gb) color information, and the pixel data SG(2, 2) includes blue (B) color information. The color information obtained by a green filter to which a red (R) filter is adjacent in the first direction (horizontal direction) is denoted as Gr, and color information obtained by a green filter to which a blue (B) filter is adjacent in the first direction is denoted as Gb As illustrated in FIG. 2, the demosaic unit 24 generates color information which is insufficient for each pixel data SG by interpolating pixel data SG around that pixel data SG. For example, the demosaic unit 24 generates red color information corresponding to the pixel data SG(1, 2) by straightly interpolating color information (red) of the pixel data SG(1, 1) and color information (red) of pixel data SG(1, 3). The demosaic unit 24 generates color information of color other than a corresponding color filter for each of pixel data SG. The demosaic unit 24 generates pixel data including three color information, i.e., RGB format pixel data. Further, the demosaic unit 24 converts RGB format pixel data into YCbCr (Y(brightness), Cb, Cr (color difference)) format data. Image data after conversion includes a plurality of pixel data, and each pixel data includes brightness information and color difference information.

The demosaic unit 24 may execute color converting processing, edge enhancing processing, and gamma controlling processing. The demosaic unit 24 may execute these processing with appropriate timing in accordance with necessary data format.

Each of an extracting unit 25 and a synthesizer 27 processes image data of a frame at a certain position of a series of frames which are output from the demosaic unit 24. For example, the synthesizer 27 processes image data (e.g., frame Fc in FIG. 3) which is output from the demosaic unit 24 every video recording cycle of the recording apparatus illustrated in FIG. 1. The extracting unit 25 processes frames (e.g., frames Fa and Fb) between frames (e.g., frames Fc in FIG. 3) processed by the synthesizer 27.

In the example illustrated in FIG. 3, the demosaic unit 24 sequentially outputs a series of frames. Of the series of frames which are output from the demosaic unit 24, the extracting unit 25 processes a [3n−2]-th (n=1, 2, ...) frame Fa, and a [3n−1]-th frame Fb. Of frames which are continuously output from the demosaic unit 24, the synthesizer 27 processes a [3n]-th frame Fc. A frame processed by the extracting unit 25 may be referred to as an extraction frame, and a frame processed by the synthesizer 27 may be referred to as a synthesis frame.

The extracting unit 25 estimate a portion or a region having a set color from image data of the frame Fa, and stores, in a memory 26, pixel information included in the region and information of the region. The memory 26 is one example of a storage unit.

In the case of a drive recorder as a vehicle-installed system, the set colors may be colors of light displaying portions of a traffic light. For example, the set colors are a color of a red light displaying portion, a color of a yellow light displaying portion and a color of a blue light displaying portion of a traffic light. The extracting unit 25 estimates a region corresponding to a light displaying portion of the traffic light, and stores, in the memory 26, pixel information included in the estimated region and information of the estimated region. The estimated region may be referred to as a light-displaying-portion region. Pixel information included in the light-displaying-portion region includes a pixel value (pixel color) and a pixel coordinate value. Information of the light-displaying-portion region (region information) includes a top coordinate of the light-displaying-portion region, and the number of pixels included in the light-displaying-portion region.

The demosaic unit 24 sequentially outputs image data of frames for every line of frames. For example, in the case of image data SF of one frame illustrated in FIG. 5A, the demosaic unit 24 sequentially outputs pixel data included in the uppermost stage line from left to right. In practice, the demosaic unit 24 outputs image data of format (YCbCr format) after the conversion. If the demosaic unit 24 outputs all of pixel data included in the line, the demosaic unit 24 sequentially outputs pixel data included in the second stage line like the first stage line. If the outputting operation of all of pixel data included in the last stage line is completed, the outputting operation of image data of one frame is completed.

The extracting unit 25 estimates a light-displaying-portion region by checking pixel data configuring image data which is output from the demosaic unit 24. That is, the extracting unit 25 estimates a light-displaying-portion region for every line included in the frame Fa. Of the pixel data included in the estimated light-displaying-portion region, the extracting unit 25 outputs a coordinate value of first checked pixel data as a top coordinate. Further, the extracting unit 25 outputs the number of pixels included in the estimated light-displaying-portion region.

Similarly, the extracting unit 25 extracts, from the frame Fb, a region in which a pixel having a set color is included (a light-displaying-portion region). The extracting unit 25 stores, in the memory 26, pixel information included in the extracted light-displaying-portion region, and information (region information) of the light-displaying-portion region.

The synthesizer 27 reads out, from the memory 26, data of the light-displaying-portion region stored in the memory 26 by the extracting unit 25. The synthesizer 27 generates an output frame Fd by synthesizing a synthesis frame Fc which is output from the demosaic unit 24 and the light-displaying-portion region. The synthesizer 27 outputs the generated output frame Fd.

More specifically, data of the light-displaying-portion region stored in the memory 26 includes a coordinate value and a pixel value of a pixel included in the light-displaying-portion region. The pixel value is YCbCr format data. The demosaic unit 24 sequentially outputs data (pixel values) of pixels included in the synthesis frame Fc. The synthesizer 27 counts the number of input pixels. This count value corresponds to a position of a line in which the input pixels are included and a position of input pixels in each line. That is, the synthesizer 27 obtains each input pixel coordinate value by counting the number of input pixels.

Of pixels included in the light-displaying-portion region, the synthesizer 27 synthesizes a pixel value of an input pixel and a pixel value of a pixel having a coordinate value which is equal to the coordinate value of the input pixel, and generates a pixel value of an output pixel. The synthesizer 27 synthesizes a plurality of pixel values by alpha blending operation for example, and generates a pixel value of an output pixel. The pixel value of the output pixel is included in the output frame Fd. The synthesizer 27 outputs the pixel value of the generated output pixel.

An output unit 28 outputs, to outside of the image pickup apparatus 11, a signal which is based on output data which are sequentially output from the synthesizer 27. At least one of the processing units included in the image pickup apparatus 11 is mounted on a chip (SoC: System on Chip). A control unit (e.g., CPU: Central Processing Unit) which controls the entire image pickup apparatus 11 is mounted on the chip. For example, the demosaic unit 24, the extracting unit 25, the synthesizer 27 and the output unit 28 are mounted on the chip. At least one of the image pickup unit 22, the timing controller 23 and the memory 26 may be mounted on the chip.

Next, details of the extracting unit 25 will be described.

As illustrated in FIG. 4, the extracting unit 25 includes a signal color setting unit 31, a signal color determining unit 32, an achromatic color/saturation determining unit 33, and a determination output unit 34.

Signal color region information is registered or stored in the signal color setting unit 31. The signal color region information includes a set color corresponding to a color of a light displaying portion of a traffic light, and a threshold value for determining a light displaying portion. The set color may be a pair of color values corresponding to two color differences Cb and Cr which are determined for every color of the light displaying portions of the traffic light. For example, a control unit (CPU) registers or stores the signal color region information in the signal color setting unit 31.

Figure 7:
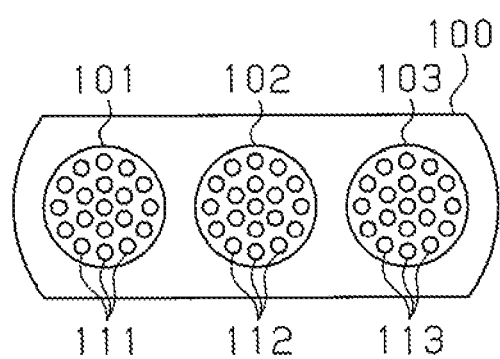
FIG. 7 is a schematic view of a traffic light.

As illustrated in FIG. 7, a traffic light 100 includes blue, yellow and red light displaying portions 101, 102 and 103 respectively corresponding to three signal colors. The blue light displaying portion 101 includes a plurality of light emitting diodes (LEDs) 111 which are arranged at a distance from one another. Each of the light emitting diodes 111 is intermittently driven by a commercial power supply for example, and emits blue light. The yellow light displaying portion 102 includes a plurality of light emitting diodes (LEDs) 112 which are arranged at a distance from one another. Each of the light emitting diodes 112 is intermittently driven by the commercial power supply for example, and emits yellow light. The red light displaying portion 103 includes a plurality of light emitting diodes (LEDs) 111 which are arranged at a distance from one another. Each of the light emitting diodes 113 is intermittently driven by the commercial power supply for example, and emits red light.

Figure 8:
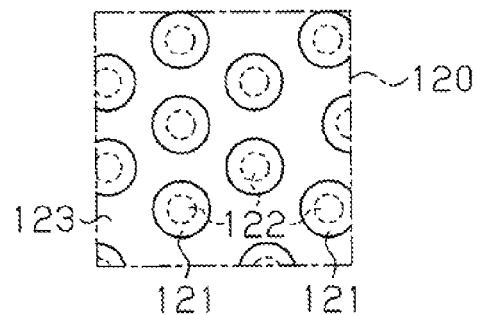
FIG. 8 is an enlarged schematic view of an image of a light displaying portion.

An image 120 of a light displaying portion (e.g., red light displaying portion 103) of the traffic light 100 includes element regions 121 indicating a light emitting diode 113 which emitted red light as illustrated in FIG. 8. Signal color region information registered or stored in the signal color setting unit 31 illustrated in FIG. 4 includes set colors and threshold values respectively corresponding to red, yellow and blue element regions 121.

Generally, brightness of light emitted from each of the light emitting diodes 113 is higher at a center portion and becomes lower toward its periphery. Therefore, as illustrated in FIG. 8, pixel values of one or more colors in three primary colors are saturated in the vicinity of the center of the element region 121 in some cases. A region formed by a plurality of saturated pixels may be referred to as a saturation region 122. A region between the light emitting diodes, i.e., a pixel located on the outer side of the element region 121 has an achromatic color (gray or black). A region of a pixel having the achromatic color may be referred to as an achromatic color region 123. These signal color, saturation color and achromatic color may be collectively referred to as a light displaying portion color. A color which does not correspond to colors of the light displaying portions 101 to 103 of the traffic light 100 may be referred to as a non-light displaying portion color. A region having the non-light displaying portion color may be referred to as a non-light-displaying-portion region (non-subject region).

Pixel data of the frames Fa and Fb which are output from the demosaic unit 24 illustrated in FIG. 2 is sequentially supplied to the signal color determining unit 32, the achromatic color/saturation determining unit 33 and the determination output unit 34 illustrated in FIG. 4.

The signal color determining unit 32 (first determining unit) reads out signal color region information stored in the signal color setting unit 31. Of color information included in the input pixel data, the signal color determining unit 32 calculates an absolute value of a difference between values (color difference values) of the color differences Cb and Cr and color values of the light displaying portions 101 to 103. The signal color determining unit 32 compares the calculated absolute values and the threshold value with each other, and if the calculated absolute values are not more than the threshold value, the signal color determining unit 32 determines that the input pixel is included in a corresponding region. Based on a result of the determination, the signal color determining unit 32 outputs a code [signal color code] indicative of a color region where the input pixel is included. When the input pixel is not included in any of the element regions 121, the signal color determining unit 32 outputs a code [non-color code] indicative of this fact.

The achromatic color/saturation determining unit 33 (second determining unit) determines a state of each pixel data based on the color information included in the pixel data, and outputs a code corresponding to a result of the determination. The achromatic color/saturation determining unit 33 determines whether a pixel of pixel data has an achromatic color based on color difference information CbCr of color information included in input pixel data. The achromatic color is a color in which three primary colors are equally mixed with each other, and the color difference information becomes Cb=Cr=0. For example, when each of the values of color difference information Cb and Cr (calculated absolute values) included in the color information of pixel data is not more than a threshold value (value close to zero), the achromatic color/saturation determining unit 33 determines the pixel of the pixel data as having an achromatic color, and when the values of color difference information Cb and Cr are greater than the threshold value, the achromatic color/saturation determining unit 33 determines that the pixel of the pixel data does not have the achromatic color.

The achromatic color/saturation determining unit 33 determines whether a pixel value of pixel data is saturated based on brightness information Y of color information included in the input pixel data. For example, in color information of a pixel included in a center region 122, brightness Y has a maximum value. Therefore, the achromatic color/saturation determining unit 33 determines whether the pixel value is saturated based on the brightness value included in the color information of the pixel data. In accordance with a result of determination, the achromatic color/saturation determining unit 33 outputs any of a code [saturation color code] indicative of saturation, a code [achromatic color code] indicative of an achromatic color, and a code [non-subject code] indicative of a fact that the code is not the saturation color code or the achromatic color code.

The determination output unit 34 estimates a region (light displaying-portion region (region-to-be-extracted)) corresponding to the light displaying portions 101 to 103 of the traffic light 100 based on the code which is output from the signal color determining unit 32 and based on the code which is output from the achromatic color/saturation determining unit 33. The determination output unit 34 outputs pixel data of a pixel included in the estimated light displaying-portion region. The determination output unit 34 includes two counters 41 and 42, and determines validity of the estimated light displaying-portion region based on count values of the counters 41 and 42. The determination output unit 34 outputs region information of the light displaying-portion region in accordance with a result of determination.

Determination and output data of the determination output unit 34 will be described.

The determination output unit 34 determines whether a pixel is included in a region [light displaying-portion region] corresponding to each of the light displaying portions 101 to 103 of the traffic light 100 based on codes which are output from the signal color determining unit 32 and the achromatic color/saturation determining unit 33, and based on a result of determination with respect to the pixel located before by one pixel. The light displaying-portion region includes regions including pixels of the light displaying portion colors, i.e., the element region 121, the saturation region 122 and the achromatic color region 123 as illustrated in FIG. 8. An outer side of the light displaying-portion region includes a pixel of the non-light displaying portion color.

[When Pixel Located Before by One Pixel Belongs to Non-Light-Displaying-Portion Region]

When a signal color code is output from the signal color determining unit 32, the determination output unit 34 determines an input pixel as a pixel included in the light displaying-portion region, and outputs pixel data of the pixel. The determination output unit 34 stores, in a register 43, the signal color code corresponding to the input pixel and an input pixel coordinate value. The determination output unit 34 initializes the counters 41 and 42. In this initializing operation, the determination output unit 34 sets count values of the counters 41 and 42 to "1".

When a code other than the signal color code is output from the signal color determining unit 32, the determination output unit 34 determines the input pixel as a pixel which is not included in the light displaying-portion region, i.e., as a pixel included in the non-light-displaying-portion region.

[Pixel Located Before by One Pixel Belongs to Light Displaying-Portion Region]

When the signal color code is output from the signal color determining unit 32 or when the saturation color code or the achromatic color code is output from the achromatic color/saturation determining unit 33, the determination output unit 34 determines the input pixel as a pixel included in the light displaying-portion region, and outputs pixel data of that pixel. The determination output unit 34 counts up a count value of the pixel number counter 41. The determination output unit 34 counts up a count value of the signal color counter 42 when the signal color code is output from the signal color determining unit 32.

When a non-color code is output from the signal color determining unit 32 and a non-subject code is output from the achromatic color/saturation determining unit 33, the determination output unit 34 determines the input pixel as a pixel included in the non-light-displaying-portion region, and determines validity of the output pixel.

When a count value of the pixel number counter 41 is not less than a certain threshold value and a count value of the signal color counter 42 is not less than a rate of a certain value with respect to the count value of the pixel number counter 41, the determination output unit 34 determines that the estimation of the output pixel is validated. The count value of the pixel number counter 41 is the number of times that it is determined the input pixel is included in the light displaying-portion region, i.e., a continuous number of input pixels determined as being included in the light displaying-portion region. The count value of the signal color counter 42 is the number of input pixels which are signal colors.

When a vehicle provided with this system approaches an intersection etc., the light displaying portions 101 to 103 of the traffic light 100 are videotaped with a certain size or greater. Therefore, in the videotaped image, the light displaying-portion regions have a certain length with respect to the corresponding light displaying portions 101 to 103, and a ratio in which an area of pixels having the signal color occupies the light displaying-portion region becomes not less than a certain value. When the determination output unit 34 determines that the estimation of the output pixel is validated, the determination output unit 34 outputs region information. The region information includes a coordinate value stored in the register 43 and a count value of the pixel number counter 41. In the coordinate value stored in the register 43, the pixel located before by one pixel belongs to the non-light-displaying-portion region, and is an input pixel coordinate value which is determined as being included in the light-displaying-portion region. That is, this coordinate value indicates a top coordinate value of the light displaying-portion region.

Figure 6:
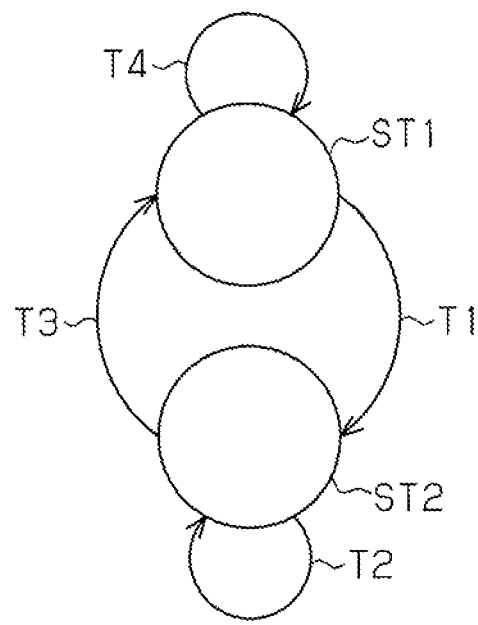
FIG. 6 is an explanatory diagram of operation of the extracting unit.

A state of the determination output unit 34 transits as illustrated in FIG. 6 (state transition).

That is, in a state ST1, it is determined that an input pixel is included in the non-light-displaying-portion region. When a condition T1 (the pixel located before by one pixel is a non-light-displaying-portion region, and a next input pixel color is a signal color) is satisfied, the state transits to a state ST2. At this time, the input pixel color is stored in the register 43 as a light displaying portion signal color. The counters 41 and 42 are initialized. Next, in the state ST2, when a condition T2 (the input pixel color is any of light displaying portion signal color, achromatic color and saturation color stored in the register 43) is satisfied, the count value of the pixel number counter 41 is updated. Further, when the input pixel color is the light displaying portion signal color, the count value of the signal color counter 42 is updated. In the state ST2, if a condition T3 (the input pixel color is not any of light displaying portion signal color, achromatic color or saturation color stored in register 43) is satisfied, validity is determined and the state is transited to the state ST1. Next, in the state ST1, if a condition T4 (the input pixel color is other than signal color) is satisfied, the state is transited to the state ST1.

The processing of the determination output unit 34 will be described in accordance with FIG. 9.

Figure 9:
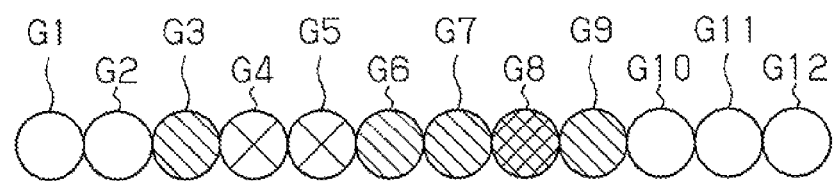
FIG. 9 is an explanatory diagram of estimating processing of a light-displaying-portion region.

As illustrated in FIG. 9, pixels G1 to G12 are sequentially input. For example, the pixels G3, G6, G7 and G9 have a signal color, the pixels G4 and G5 have an achromatic color, a pixel G8 has a saturation color, and pixels G1, G2 and G10 to G12 have a color other than the former colors.

When the pixel G2 is input, since the pixel G1 located before the pixel G2 by one pixel has a color other than the signal color and the pixel G2 has a color other than the signal color, the determination output unit 34 does not output pixel data of the pixel G2. Next, when the pixel G3 is input, the pixel G2 located before the pixel G3 by one pixel has a color other than the signal color, and the pixel G3 has the signal color. Therefore, the determination output unit 34 outputs pixel data of the pixel G3, stores the color information of the pixel G3 in the register 43 as a light displaying portion signal color, and initializes the counters 41 and 42. Next, when the pixel G4 is input, the pixel G3 located before the pixel G4 by one pixel has the signal color, and the pixel G4 has the achromatic color. Therefore, the determination output unit 34 outputs pixel data of the pixel G4 and updates the pixel number counter 41. When the pixel G5 is input, the pixel G4 located before the pixel G5 by one pixel has the achromatic color, and the pixel G5 has the achromatic color. Therefore, the determination output unit 34 outputs pixel data of the pixel G5 and updates the pixel number counter 41.

Next, when the pixel G6 is input, the pixel G5 located before the pixel G6 by one pixel has the achromatic color, and color information of the pixel G6 is equal to the light displaying portion signal color stored in the register 43. Therefore, the determination output unit 34 outputs pixel data of the pixel G6, and updates the pixel number counter 41 and the signal color counter 42. When the pixel G7 is input, the pixel G6 located before the pixel G7 by one pixel has the light displaying portion signal color, and color information of the pixel G7 is equal to the light displaying portion signal color. Therefore, the determination output unit 34 outputs pixel data of the pixel G7, and updates the pixel number counter 41 and the signal color counter 42. Next, when the pixel G8 is input, the pixel G7 located before the pixel G8 by one pixel has the light displaying portion signal color, and the pixel G8 has the saturation color. Therefore, the determination output unit 34 outputs pixel data of the pixel G8 and updates the pixel number counter 41. Next, when the pixel G9 is input, the pixel G8 located before the pixel G9 by one pixel has the saturation color, and the pixel G9 has the light displaying portion signal color. Therefore, the determination output unit 34 outputs pixel data of the pixel G9 and updates the pixel number counter 41 and the signal color counter 42. Next, when the pixel G10 is input, the pixel G9 located before the pixel G10 by one pixel has the light displaying portion signal color, and the pixel G10 has a color which is not any of the light displaying portion signal color, the achromatic color and the saturation color. Therefore, the determination output unit 34 determines validity.

That is, the determination output unit 34 estimates that the pixels G3 to G9 are light displaying-portion regions. At this time, the count value of the pixel number counter 41 is "7", and the count value of the signal color counter 42 is "4". For example, if a threshold value for determining a region is "4", since the count value of the pixel number counter 41 is not less than the threshold value, the determination output unit 34 determines that the light displaying-portion region estimated based on the pixels G3 to G9 is validated, and outputs a top coordinate of the light displaying-portion region, i.e., the coordinate value of the pixel G3, and a count value (=7) of the pixel number counter 41.

Figure 10:
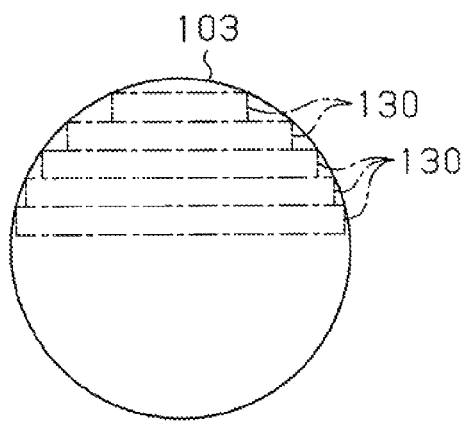
FIG. 10 is an explanatory diagram of the light-displaying-portion region.

By the above-described processing, a light displaying-portion region of the traffic light 100 is estimated. For example, a plurality of light-displaying-portion regions 130 are estimated with respect to the light displaying portion 103 illustrated in FIG. 10. Each of the light displaying-portion regions 130 includes the pixels G3 to G9 illustrated in FIG. 9, i.e., pixels having any one of the signal color, the saturation color and the achromatic color. Pixel data of the pixel included in the plurality of light-displaying-portion regions 130 is stored in the memory 26 illustrated in FIG. 2 as partial image data.

Next, processing of the image pickup apparatus 11 will be described.

Figure 11:
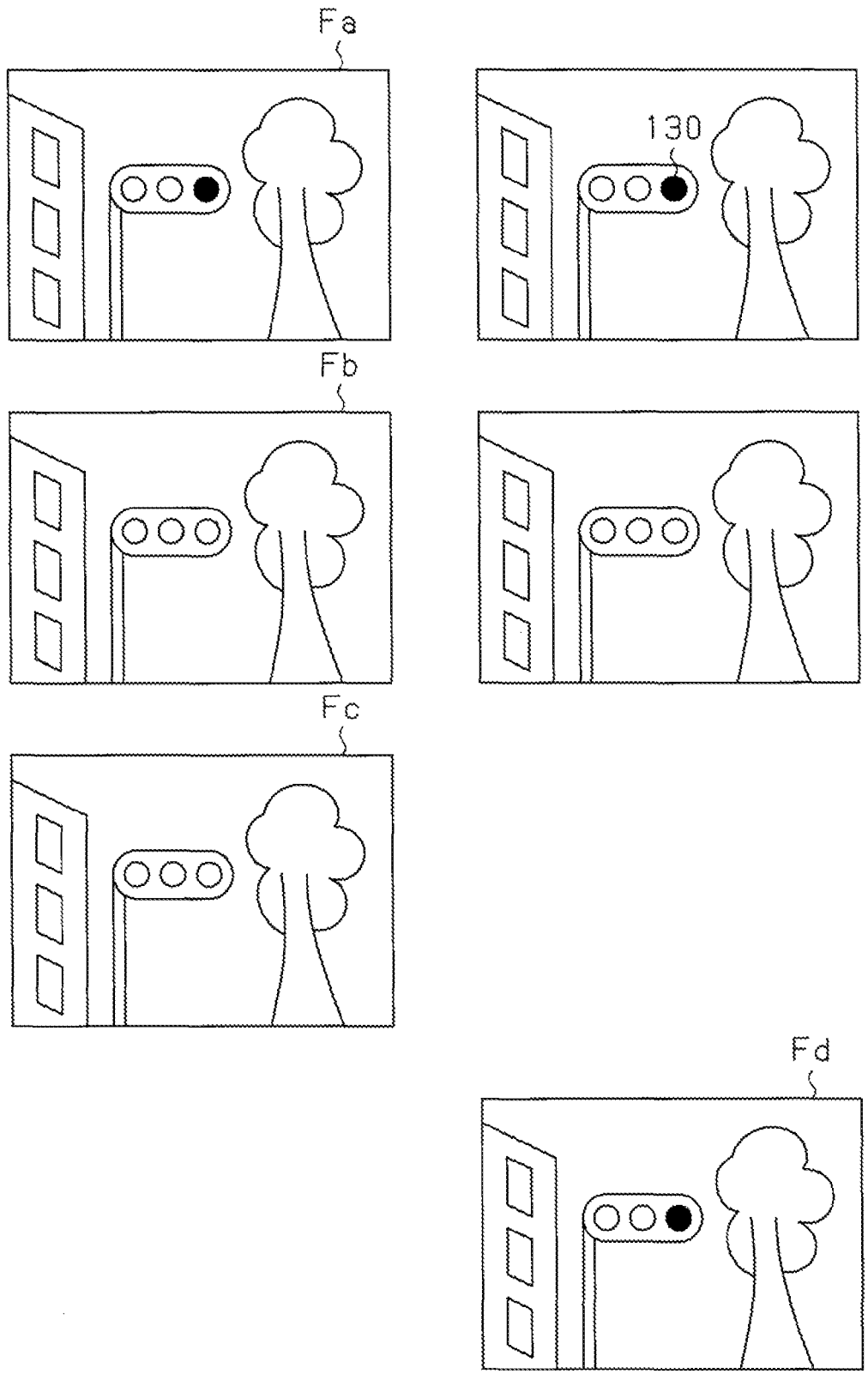
FIG. 11 is an explanatory scheme of extracting processing and synthesizing processing with respect to a frame.

As illustrated in FIG. 11 for example, three frames Fa, Fb and Fc are output from the demosaic unit 24 in one video recording cycle.

In a traffic light 100 included in the first frame Fa, a third light displaying portion 103 lights up. Therefore, the extracting unit 25 extracts the light-displaying-portion region 130 corresponding to the third light displaying portion 103 from the frame Fa, and stores the same in the memory 26. The light-displaying-portion region 130 stored in the memory 26 is partial image data with respect to image data of the entire frame Fa.

Next, in a traffic light 100 included in the second frame Fb, any of the light displaying portions 101 to 103 do not light up. Therefore, the extracting unit 25 does not store the partial image data corresponding to the second frame Fb in the memory 26.

Next, in a traffic light 100 included in the third frame Fc, any of the light displaying portions 101 to 103 do not light up. The synthesizer 27 synthesizes partial image data (light-displaying-portion region 130) stored in the memory 26 with respect to the third frame Fc, and generates an output frame Fd. The generated output frame Fd is stored in the recording apparatus 12 illustrated in FIG. 1. That is, the output frame Fd in which the third light displaying portion 103 lights up is recorded.

In a next video recording cycle also, partial image data corresponding to the light displaying portion which lights up is similarly stored in the memory 26 from two frames, the partial image data is synthesized into next one frame and an output frame is generated.

One output frame Fd is recorded in every video recording cycle in the recording apparatus 12 illustrated in FIG. 1. Therefore, recording intervals between a plurality of output frames Fd recorded in the recording apparatus 12 are constant. Hence, when a plurality of output frames Fd are played back as a moving image, video bringing no feeling of strangeness may be obtained. Even if the light displaying portions 101 to 103 of the traffic light 100 included in the frame Fc which is videotaped every video recording cycle do not light up, partial image data extracted from another plurality of frames Fa and Fb in the video recording cycle are synthesized into a frame Fc and an output frame Fd is generated. Hence, the number of output frames including a traffic light 100 in which all of the light displaying portions 101 to 103 do not light up is reduced. Therefore, in the played back video, it is possible to check which light displaying portion 101 to 103 of the traffic light 100 lights up.

As described above, according to the embodiment, the following effects may be obtained.

(1) The image pickup unit 22 outputs a plurality of (three, for example) frames Fa, Fb and Fc in one video recording cycle of the recording apparatus 12. The extracting unit 25 processes a [3n−2]-th (n=1, 2, . . . ) frame Fa and a [3n−1]-th frame Fb of frames which are continuously output from the demosaic unit 24. The synthesizer 27 processes a [3n]-th frame Fc of frames which are continuously output from the demosaic unit 24.

The extracting unit 25 estimates a region having a set color from image data of the frames Fa and Fb, and stores pixel information included in the region and information of the region in the memory 26. The synthesizer 27 reads out, from the memory 26, data of the light displaying-portion region which is stored in the memory 26 by the extracting unit 25. The synthesizer 27 synthesizes the light displaying-portion region and the synthesis frame Fc which is output from the demosaic unit 24, and generates the output frame Fd.

Therefore, the image pickup apparatus 11 outputs image data GD in accordance with the output frame Fd which is output by the synthesizer 27. That is, the image pickup apparatus 11 outputs the output frame Fd every video recording cycle of the recording apparatus 12. Therefore, recording intervals between a plurality of output frames Fd recorded in the recording apparatus 12 are constant. Hence, when a plurality of output frames Fd are played back as a moving image, video bringing no feeling of strangeness may be obtained.

(2) Even if the light displaying portions 101 to 103 of the traffic light 100 included in the frame Fc which is videotaped every video recording cycle do not light up, partial image data extracted from another plurality of frames Fa and Fb in the video recording cycle are synthesized into the frame Fc and the output frame Fd is generated. Hence, the number of output frames including a traffic light 100 in which all of the light displaying portions 101 to 103 do not light up is reduced. Therefore, it is possible to check which light displaying portion (101 to 103) of the traffic light 100 lights up.

(3) The extracting unit 25 estimates whether the input pixel forms the light displaying-portion region based on signal color region information stored in the signal color setting unit 31. The extracting unit 25 stores, in the memory 26, a pixel value of a pixel which is estimated as the light displaying-portion region. Therefore, even if the light displaying portions 101 to 103 have shapes other than circle, the light displaying-portion regions are estimated. Accordingly, the extracting units 25 may extract not only a traffic light 100 having circular light displaying portions 101 to 103 but also a light displaying portion of an arrow traffic light, a pedestrian traffic light, and a character display traffic light, for example.

(4) The extracting unit 25 estimates whether the input pixel forms a light displaying-portion region based on signal color region information stored in the signal color setting unit 31. The extracting unit 25 stores, in the memory 26, a pixel value of a pixel which is estimated as a light displaying-portion region. Therefore, a capacity of the memory 26 may be small as compared with a case where the entire frame is stored in the memory. This contributes to restraining an area of a semiconductor device (chip) on which the extracting unit 25 and the memory 26 are mounted from increasing.

(5) The determination output unit 34 includes the counter 41 which counts pixels estimated as light displaying-portion regions, and the counter 42 which counts pixels determined as signal colors. The determination output unit 34 determines validity of the light displaying-portion region based on the count values of the counters 41 and 42. Therefore, regions corresponding to the light displaying portions 101 to 103 are extracted, a region which does not correspond to the light displaying portions 101 to 103 is eliminated and according to this configuration, it is possible to precisely extract a region.

(6) The extracting unit 25 includes the signal color determining unit 32 which determines a signal color, and the achromatic color/saturation determining unit 33 which determines achromatic color/saturation color. The achromatic colors are portions of the light displaying portions 101 to 103 where the light emitting diodes 111 to 113 are not mounted, and the saturation color corresponds to center portions of the light emitting diodes 111 to 113 where brightness is high. Therefore, it is possible to reliably extract regions corresponding to the light displaying portions 101 to 103 of the LED traffic light 100. It is possible to reliably extract the light displaying portions 101 to 103 of the LED traffic light 100 using the light emitting diodes 111 to 113.

Next, a second embodiment of the image pickup apparatus will be described.

The same constituent parts as those of the first embodiment are designated with the same symbols, and a portion or all of drawings and description will be omitted.

Figure 12:
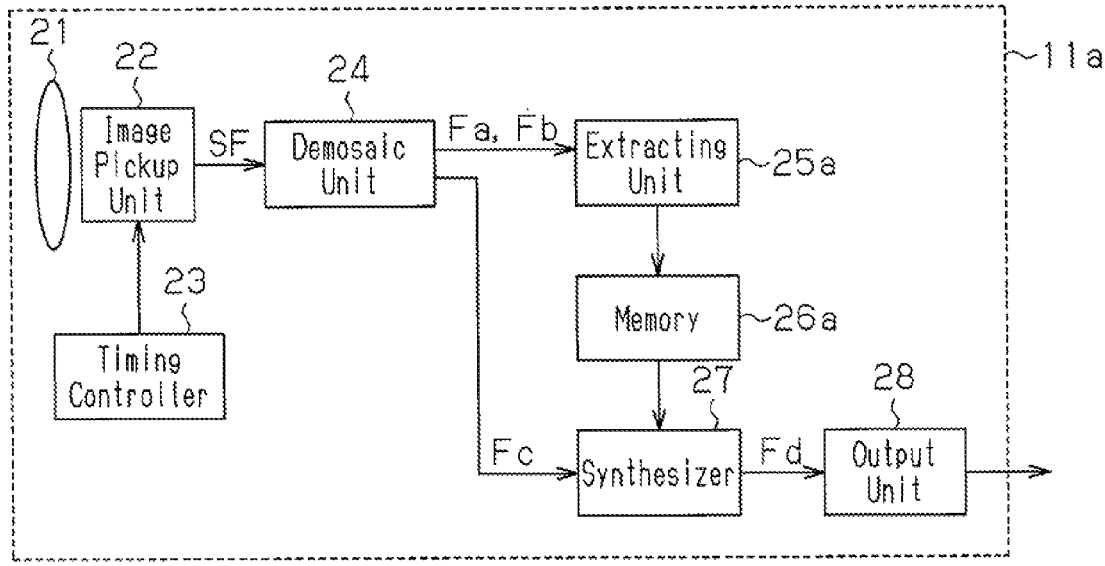
FIG. 12 is a block diagram of an image pickup apparatus according to a second embodiment.

As illustrated in FIG. 12, an image pickup apparatus 11a includes a lens 21, an image pickup unit 22, a timing controller 23, a demosaic unit 24, an extracting unit 25a, a memory 26a, a synthesizer 27, and an output unit 28.

The extracting unit 25a estimates a light displaying-portion region based on pixels of a first frame Fa and a second frame Fb, and outputs image data of a pixel included in the estimated light displaying-portion region, and a write address for storing the image data. The memory 26a stores image data at the write address. The extracting unit 25a determines validity with respect to the estimation of the light displaying-portion region, and controls the write address with respect to the memory 26a in accordance with a result of determination.

Figure 13:
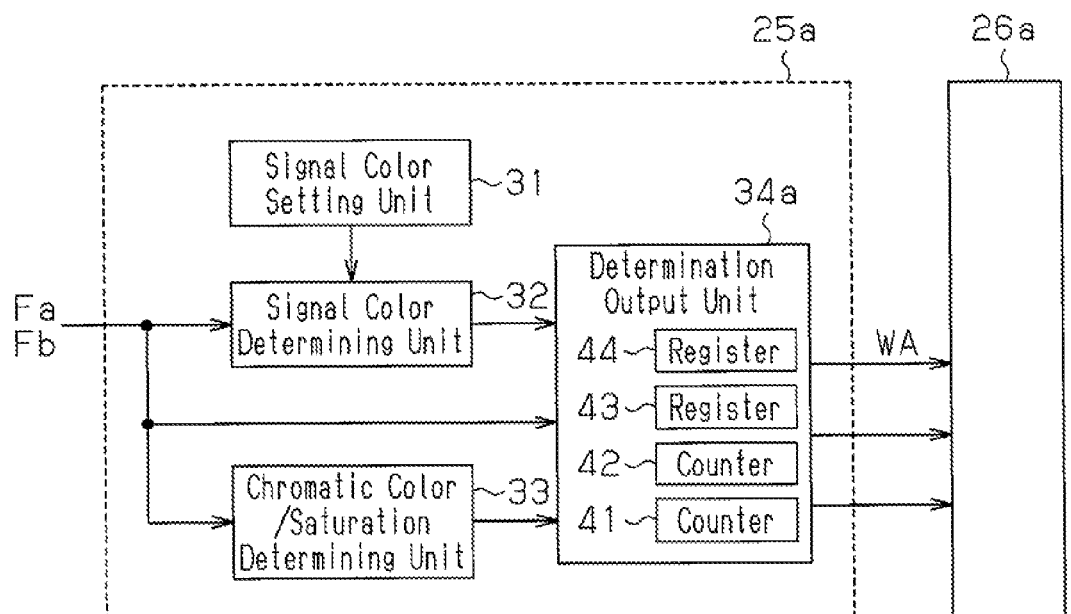
FIG. 13 is a block diagram of an extracting unit of FIG. 12.

As illustrated in FIG. 13, the extracting unit 25a includes a signal color setting unit 31, a signal color determining unit 32, an achromatic color/saturation determining unit 33, and a determination output unit 34a. The determination output unit 34a controls a write address with respect to the memory 26a in accordance with a result of determination of validity.

The determination output unit 34a includes a pixel number counter 41, a signal color counter 42, a register 43 and a register 44.

The determination output unit 34a outputs a write address WA to the memory 26a whenever pixel data is output, and increments the write address WA. The memory 26a stores pixel data in a region corresponding to the write address WA. The increment of the write address WA is for setting an address at which pixel data of a next pixel is stored. Therefore, the determination output unit 34a adds (increments) a value corresponding to a data amount of pixel data stored in the memory 26a to the write address WA, and sets a write address WA at which next pixel data is stored.

The determination output unit 34a stores a region starting address in the register 44. The region starting address is an address of the memory 26a in which a first pixel data which is determined as the light displaying-portion region is stored. When a first pixel which is determined as the light displaying-portion region, i.e., the previous pixel is a non-light-displaying-portion region and an input pixel is determined as the light displaying-portion region, the determination output unit 34a stores the write address WA in the register 44. The write address WA stored in the register 44 is a region starting address.

When the determination output unit 34a determines that the light displaying-portion region is validated based on a result of determination of validity with respect to the light displaying-portion region, the state is transited to the state ST1 without changing the contents of the write address WA and the register 44. If the determination output unit 34a determines that the light displaying-portion region is not validated on the other hand, a region starting address which is read out from the register 44 is set at the write address WA. According to this operation, the determination output unit 34a stores, at the write address WA, pixel data which is determined as a light displaying-portion region. That is, the determination output unit 34a overwrites this pixel data on pixel data which is determined as being not validated. As a result, pixel data which is determined as being not validated is not saved in the memory 26a.

Next, processing of the extracting unit 25a (determination output unit 34a) will be described.

The determination output unit 34a determines whether a plurality of continuous pixels illustrated in FIG. 14 are light displaying-portion region. In FIG. 14, hatched circles indicate pixels estimated as light displaying-portion regions, and non-hatched circles indicate pixels determined as non-light-displaying-portion region.

When the determination output unit 34a determines that the input pixel is a non-light-displaying-portion region, the determination output unit 34a determines validity of a light displaying-portion region which is estimated based on the input pixel, based on count values of the counters 41 and 42. In the following description, a ratio of the signal color pixel in the light displaying-portion region satisfies determination conditions.

The determination output unit 34a estimates that a pixel G1 illustrated in FIG. 14 is a top pixel of the light displaying-portion region, and stores a write address WA in the register 44 as a region starting address SA. The determination output unit 34a outputs, to the memory 26a, a write address WA and pixel data (color information and coordinate value) of the pixel G1, and increments the write address WA. The memory 26a stores pixel data which is output from the determination output unit 34a in a region corresponding to the write address WA which is output from the determination output unit 34a.

Similarly, the determination output unit 34a estimates pixels G2 to G4 illustrated in FIG. 14 as pixels included in the light displaying-portion region, outputs, to the memory 26a, pixel data of the pixels G2 to G4 and corresponding write address WA, and increments the write address WA every pixels G2 to G4. The memory 26a stores the pixels G2 to G4 in regions which correspond to the write address WA.

According to this operation, pixel data of pixels G1 to G4 is stored in the memory 26a as illustrated in FIG. 15A. At this time, a region top address AS indicates a region where the pixel G1 is stored, and the write address WA indicates a region where pixel data of a next pixel is stored.

Next, the determination output unit 34a determines validity of the pixels G1 to G4 by determining a pixel N1 illustrated in FIG. 14 as a non-light-displaying-portion region. For example, a threshold value of continuous pixel number is defined as "3". When a pixel N1 is determined, a count value of the pixel number counter 41 is "4". Therefore, the determination output unit 34a does not change the write address WA.

Next, like the pixels G1 to G4, the determination output unit 34a estimates pixels G5 and G6 as pixels in the light displaying-portion region, and outputs the write address WA and pixel data of the pixels G5 and G6 to the memory 26a. As a result, pixel data of the pixels G5 and G6 is stored in the memory 26a as illustrated in FIG. 15B. At this time, the region top address AS indicates a region where the pixel G5 is stored, and the write address WA indicates a region where pixel data of a next pixel is stored.

Next, the determination output unit 34a determines validity of the pixels G5 and G6 by determining a pixel N2 illustrated in FIG. 14 as a non-light-displaying-portion region. For example, a threshold value of continuous pixel number is defined as "3". When a pixel N2 is determined, a count value of the pixel number counter 41 is "2" which is smaller than the threshold value of the continuous pixel number (=3). Therefore, the determination output unit 34a reads out the region starting address SA stored in the register 44, and sets the region starting address SA at the write address WA. According to this operation, the region starting address SA and the write address WA both indicate a region where the pixel G5 is stored as illustrated in FIG. 15C.

Next, the determination output unit 34a estimates the pixel G7 illustrated in FIG. 14 as a top pixel in the light displaying-portion region, and stores the write address WA in the register 44 as the region starting address SA. The determination output unit 34a outputs, to the memory 26a, the write address WA and pixel data (color information and coordinate value) of the pixel G7, and increments the write address WA. Therefore, pixel data of the pixel G7 is overwritten on the pixel data of the pixel G5 in the memory 26a as illustrated in FIG. 15D.

Similarly, the determination output unit 34a estimates a pixel G8 illustrated in FIG. 14 as a pixel included in the light displaying-portion region, outputs, to the memory 26a, pixel data of the pixel G8 and a corresponding write address WA, and increments the write address WA. Therefore, pixel data of the pixel G8 is overwritten on the pixel data of the pixel G6 in the memory 26a as illustrated in FIG. 15D. The write address WA indicates a region where pixel data of a next pixel is stored.

Next, the determination output unit 34a determines validity of the pixels G7 and G8 by determining a pixel N3 illustrated in FIG. 14 as a non-light-displaying-portion region. In this case, the determination output unit 34a determines the pixels G7 and G8 like the pixels G5 and G6 illustrated in FIG. 15B. The determination output unit 34a reads out the region starting address SA stored in the register 44, and sets the region starting address SA at the write address WA. According to this operation, the region starting address SA and the write address WA both indicate a region where the pixel G7 is stored as illustrated in FIG. 15E.

Next, the determination output unit 34a determines the pixels G9 to G11 illustrated in FIG. 14, and stores pixel data of the pixels G9 to G11 in the memory 26a as illustrated in FIG. 15F. The determination output unit 34a determines validity of the pixels G9 to G11 by determining a pixel N4 illustrated in FIG. 14 as a non-light-displaying-portion region. In this case, the determination output unit 34a determines the pixels G9 to G11 like the pixels G1 to G4 illustrated in FIG. 15A. Therefore, the determination output unit 34a does not change the write address WA. According to this operation, as illustrated in FIG. 15F, the region starting address SA indicates a region where the pixel G9 is stored, and the write address WA indicates a region where image data of a next pixel is stored.

Only data of a pixel included in a light displaying-portion region which is determined as having validity is stored in the memory 26a. Therefore, a memory 26a having a small capacity may be used. Hence, a memory 26a having a small capacity restrains an area of a chip on which the memory 26a is mounted from increasing.

According to the above-described embodiment, the following effect may be obtained in addition to the effects of the first embodiment.

(1) When the extracting unit 25a determines estimation of the light displaying-portion region is validated, the extracting unit 25a stores a write address as a top address of a next light displaying-portion region. According to this configuration, the extracting unit 25a prepares to store, in the memory 26a, data of a pixel included in a light displaying-portion region which is estimated next.

When the extracting unit 25a determines estimation of a light displaying-portion region is not validated, the extracting unit 25a matches a write address with a top address of a row of pixels stored as a light displaying-portion region. Therefore, data of a pixel included in a light displaying-portion region which is estimated next is stored in a region where data of a pixel in a light displaying-portion region which is estimated last time is stored. That is, the extracting unit 25a overwrites data of a pixel included in the estimated light displaying-portion region on data of a pixel which is determined as not the light displaying-portion region. As a result, data of a pixel which is determined as a light displaying-portion region in the validity processing is saved, in the memory 26a, with respect to an estimated light displaying-portion region, and data which is determined as not the light displaying-portion region is not saved. That is, data of a pixel included in the light displaying-portion region which is determined as validated by the validity determination is saved in the memory 26a. Therefore, since the extracting unit 25a does not save unnecessary data in the memory 26a, it is possible to use a memory 26a having a small capacity such as a static memory (SRAM: Static Random Access Memory).

Next, a third embodiment of the image pickup apparatus will be described.

The same constituent parts as those of the above-described embodiments are designated with the same symbols, and a portion or all of description will be omitted.

Figure 16:
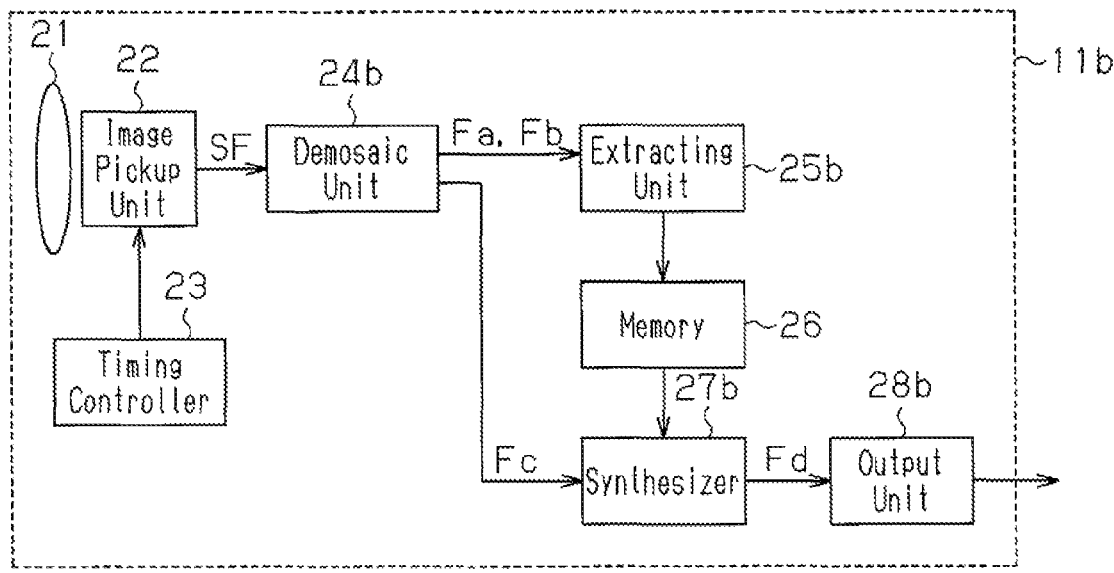
FIG. 16 is a block diagram of an image pickup according to a third embodiment.

As illustrated in FIG. 16, an image pickup unit 22 of an image pickup apparatus 11b photoelectric converts light from a subject which is formed by a lens 21, and generates pickup image data of one frame including an amount of light and color information. The image pickup unit 22 generates pickup image data of a frame of integral multiple (three times, for example) of the number of frames of video recording frequency, and outputs pickup image data of each frame. The pickup image data is of a format corresponding to a color filter possessed by the image pickup unit 22, e.g., the pickup image data is RGB format data. Each pixel in the pickup image data corresponds to the color filter, and includes color information of one color which corresponds to Bayer arrangement, for example (see FIG. 5B).

A demosaic unit 24b generates color information which is insufficient for each pixel data by interpolation of peripheral pixel data. For example, the demosaic unit 24 generates red color information corresponding to the pixel data SG (1, 2) by straight interpolation based on color information (red) of the pixel data SG (1, 1) and color information (red) of pixel data SG (1, 3) illustrated in FIG. 5B. The demosaic unit 24 generates color information of color other than a corresponding color filter for each pixel data. Pixel data generated in this manner is RGB format data including color information of three colors. The demosaic unit 24b outputs pixel data of generated pixels. That is, the demosaic unit 24b outputs RGB format image data.

Color converting processing, edge enhancing processing for enhancing edge of the image, gamma controlling processing for adjusting brightness and contrast may be carried out in the demosaic unit 24b. The demosaic unit 24b carries out these processing with appropriate timing in accordance with necessary data format.

An extracting unit 25b and a synthesizer 27b process RGB format image data which is output from the demosaic unit 24b. Of image data of frames which are output from the demosaic unit 24b, the extracting unit 25b and the synthesizer 27b are configured to process image data of frames at certain positions. For example, the synthesizer 27b is configured to process image data which is output from the demosaic unit 24b every video recording cycle of the recording apparatus illustrated in FIG. 1. The extracting unit 25b is configured to process a frame between frames processed by the synthesizer 27b.

Figure 17:
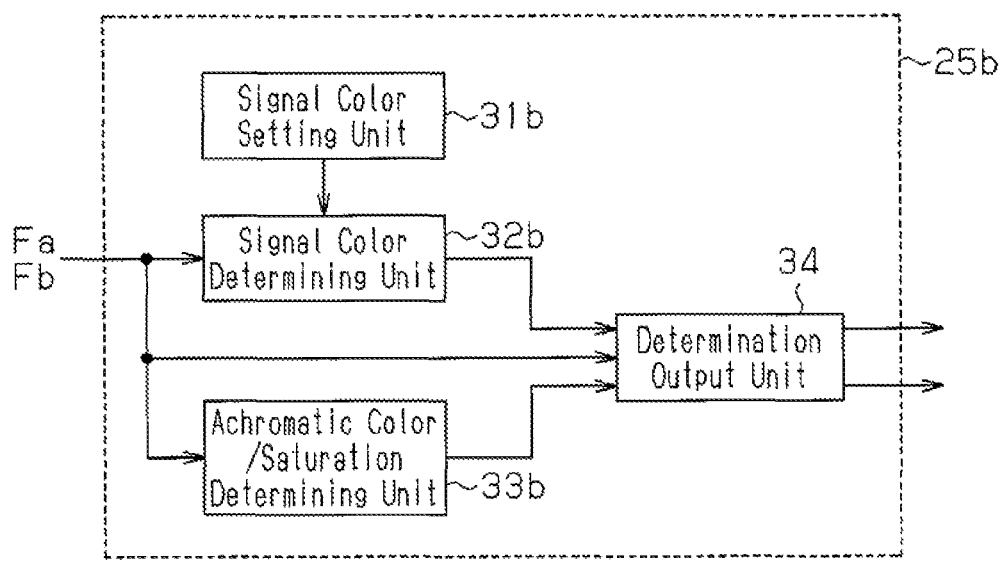
FIG. 17 is a block circuit diagram of an extracting unit of FIG. 16.

As illustrated in FIG. 17, colors of the light displaying portions 101 to 103 of the traffic light 100 illustrated in FIG. 7 are set as set colors in a signal color setting unit 31b of the extracting unit 25b. The colors of the light displaying portions 101 to 103 may be a set of values of three primary colors (RGB) having a rate corresponding to the light displaying portions 101 to 103. That is, signal colors corresponding to the light displaying portions 101 to 103 include values of RGB.

A signal color determining unit 32b reads out signal color region information stored in the signal color setting unit 31b. The signal color determining unit 32b compares a value of RGB included in the input pixel data and signal color region information with each other, and estimates a light displaying-portion region. The signal color determining unit 32b outputs a code ([signal color code] and [non-color code]) corresponding to the estimated region.

Of pixel values of colors (RGB) included in the input pixel data, if a pixel value of at least one of colors is saturated (maximum value or a value smaller than maximum value by a certain value), the achromatic color/saturation determining unit 33b outputs a code [saturation color code] indicative of saturation. The achromatic color/saturation determining unit 33b compares the pixel values of colors (RGB) with each other, calculates a difference therebetween, determines whether the pixel has an achromatic color based on the calculated difference, and outputs a code [achromatic color code] indicative of the achromatic color in accordance with a result of determination. When the condition does not fall under any of the cases, the achromatic color/saturation determining unit 33 outputs a code [non-subject code] indicative of this state.

The determination output unit 34 estimates a light displaying-portion region based on a code which is output from the signal color determining unit 32b and a code which is output from the achromatic color/saturation determining unit 33b. The determination output unit 34 determines validity of the estimated light displaying-portion region, and outputs region information of the light displaying-portion region which is determined as being validated. The region information includes a top coordinate value (pixel coordinate value included in the light displaying-portion region) of the estimated light displaying-portion region, and the pixel number included in the light displaying-portion region.

The synthesizer 27b illustrated in FIG. 16 reads out, from the memory 26, data of the light displaying-portion region stored in the memory 26 by the extracting unit 25b. This data includes a pixel value and a coordinate value of a pixel included in the light displaying-portion region, and the pixel value is RGB format data. The synthesizer 27b synthesizes a synthesis frame Fc which is output from the demosaic unit 24b and data which is read out from the memory 26 by means of alpha blend every RGB component for example, and generates a pixel value of the output pixel. The synthesizer 27b outputs a pixel value of the generated output pixel.

As described above, according to the embodiment, the following effect is obtained in addition to the effects of the first embodiment.

(1) The demosaic unit 24b outputs RGB format image data. The extracting unit 25b extracts a light displaying-portion region from RGB format frames Fa and Fb, and the synthesizer 27b synthesizes RGB format frame Fc and a pixel which is read out from the memory 26. A frame of RGB format data may be processed in this manner. In RGB format, deterioration of color resolution is smaller than that of YCbCr format data. In determination of the signal color region, more precise determination than that of the YCbCr format data may be expected.

Next, a fourth embodiment of the image pickup apparatus will be described.

The same constituent parts as those of the above-described embodiments are designated with the same symbols, and a portion or all of description will be omitted.

Figure 18:
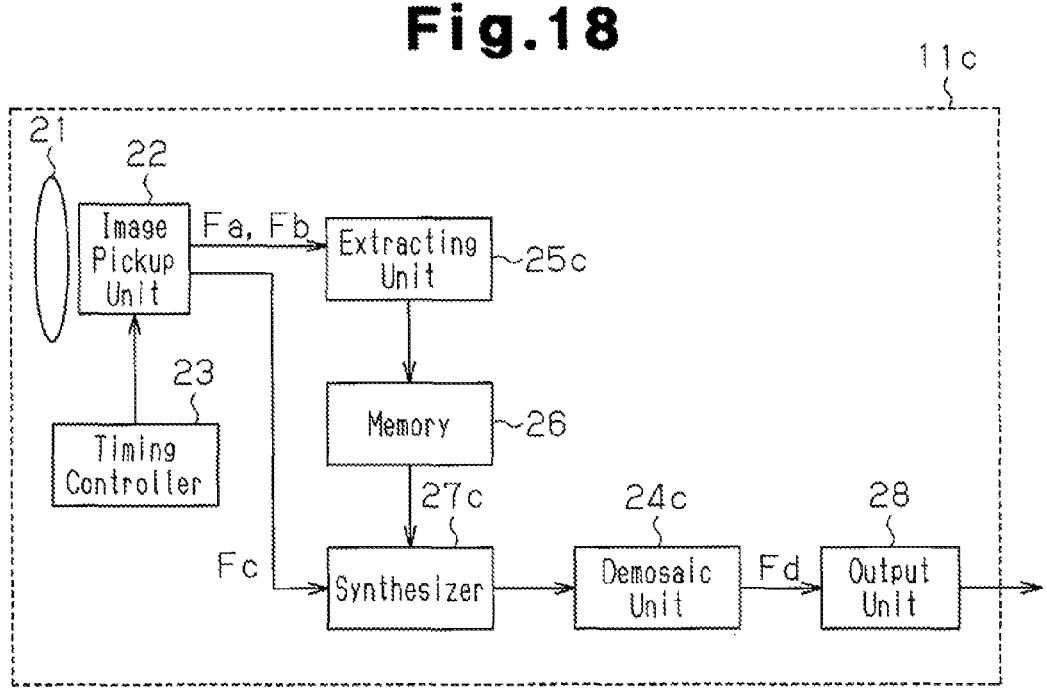
FIG. 18 is a block circuit diagram of an image pickup apparatus according to a fourth embodiment.

As illustrated in FIG. 18, an image pickup unit 22 of an image pickup apparatus 11c photoelectric converts light from a subject which is formed by a lens 21, and generates pickup image data of one frame including an amount of light and color information. The image pickup unit 22 generates pickup image data of a frame of integral multiple (three times, for example) of the number of frames of video recording frequency, and outputs pickup image data of each frame. The pickup image data is of a format corresponding to a color filter possessed by the image pickup unit 22, e.g., the pickup image data is RGB format data.

Of frames which are sequentially output from the image pickup unit 22, an extracting unit 25c and a synthesizer 27c are configured to respectively process pickup image data of frames at certain positions. For example, the image pickup unit 22 continuously outputs pickup image data of a videotaped frame with a certain cycle (⅓ of video recording cycle). The extracting unit 25c processes extraction frames Fa and Fb of frames which are continuously output from the image pickup unit 22, and the synthesizer 27c processes a synthesis frame Fc.

Each frame which is output from the image pickup unit 22 includes color information corresponding to a color filter included in the image pickup unit 22. That is, each frame is image data (Bayer data) corresponding to the Bayer arrangement, and a pixel included in each frame includes color information of one color corresponding to the color filter (see FIG. 5B).

Figure 21:
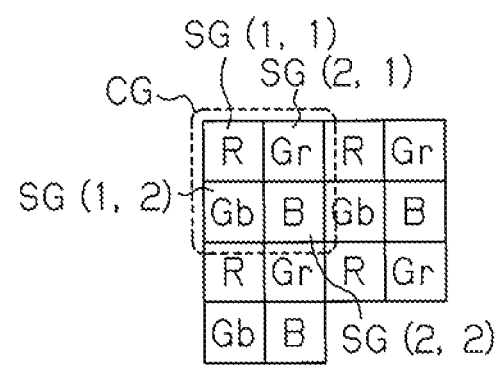
FIG. 21 is an explanatory diagram of image data.

Therefore, the extracting unit 25c synthesizes a plurality of pixels including mutually different color information, and generates a synthesized pixel. For example, as illustrated in FIG. 21, the extracting unit 25c couples a pixel SG (1, 1) including red (R) color information, a pixel SG(2, 1) and a pixel SG (1, 2) including green (Gr, Gb) color information, and a pixel SG (2, 2) including blue (B) color information to each other, and generates one synthesized pixel CG. This synthesized pixel CG includes a value of each component of RBG. That is, data of the synthesized pixel CG includes RGB format color information.

Like the extracting unit 25b, the extracting unit 25c estimates a light displaying-portion region based on color information of the generated synthesized pixel, determines validity of the estimated light displaying-portion region, and stores data of the synthesized pixel in a memory 26.

Figure 19:
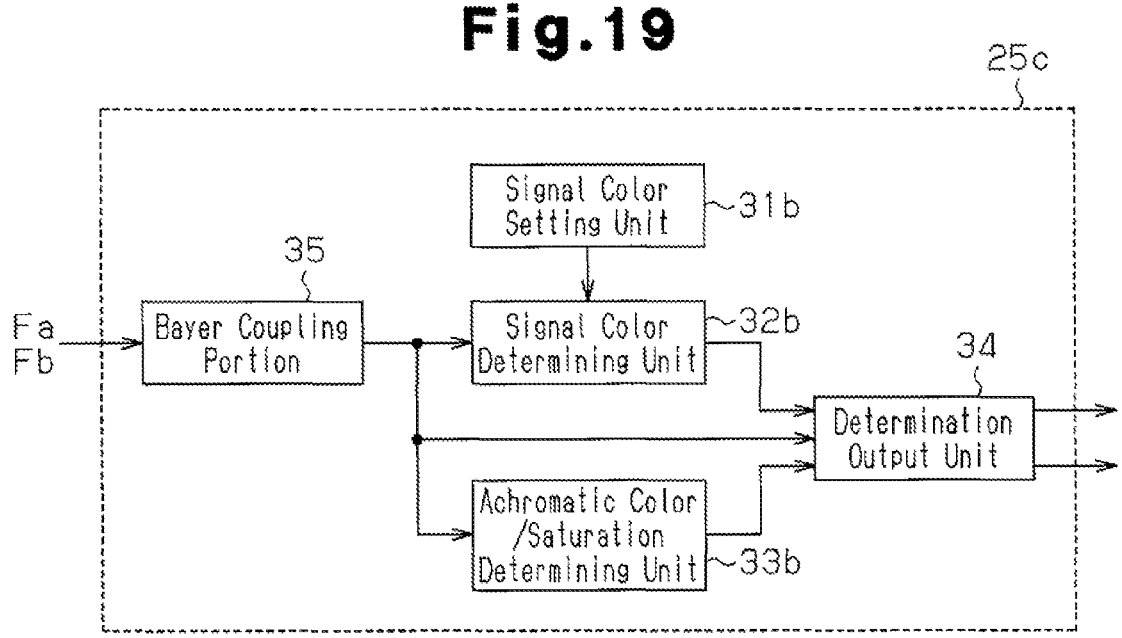
FIG. 19 is a block circuit diagram of an extracting unit of FIG. 18.

As illustrated in FIG. 19, the extracting unit 25c includes a Bayer coupling portion 35, a signal color setting unit 31b, a signal color determining unit 32b, an achromatic color/saturation determining unit 33b, and a determination output unit 34.

Figure 20:
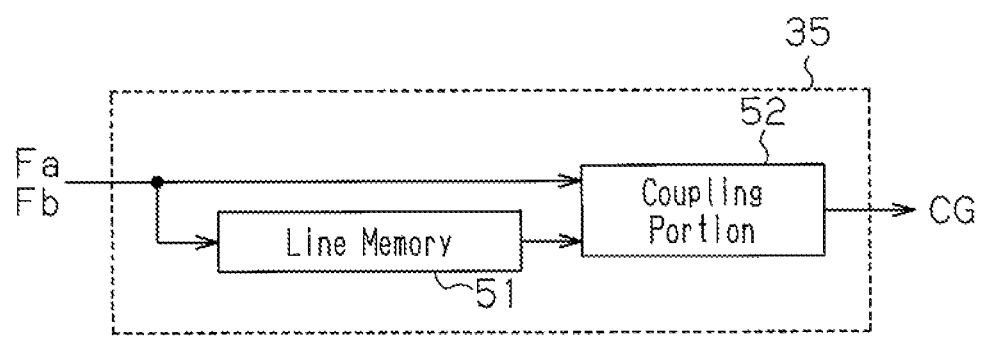
FIG. 20 is a block circuit diagram of a Bayer coupling portion of FIG. 19.

As illustrated in FIG. 20, the Bayer coupling portion 35 includes a line memory 51 which stores data of pixels of one line and a coupling portion 52. The coupling portion 52 couples an input pixel and a pixel which is output from the line memory 51 to each other to generate a synthesized pixel CG. For example, the line memory 51 stores data of pixels of an odd-numbered line of one frame. The coupling portion 52 couples, to each other, two input pixels in an even-numbered line and two pixels which are output from the line memory 51, and generates one synthesized pixel CG. The coupling portion 52 outputs the generated synthesized pixel CG.

The synthesizer 27c synthesizes a synthesis frame Fc and image data of a light displaying-portion region which is read out from the memory 26, and generates an output frame Fd. The synthesized pixel stored in the memory 26 includes RGB format color information. The pixel of the synthesis frame Fc supplied to the synthesizer 27c includes one color information corresponding to the Bayer arrangement. Therefore, of color information (R component, G component and B component) included in the synthesized pixel, the synthesizer 27c performs an alpha blending operation of color component corresponding to the input pixel and color information of the input pixel for example, and generates synthesized color information, and the synthesizer 27c outputs pixel data including the color information. That is, with respect to the four input pixels, the synthesizer 27c synthesizes components of one synthesized pixel, and generates four output pixels corresponding to the four input pixels.

A demosaic unit 24c illustrated in FIG. 18 generates color information which is insufficient for pixel data which is sequentially output from the synthesizer 27c by interpolation from color information of peripheral pixel data. The demosaic unit 24c outputs the generated RGB format pixel data.

According to the above-described embodiment, the following effects may be obtained.

(1) The extracting unit 25c estimates a light displaying-portion region based on a synthesized pixel in which four pixels are coupled to one another. Therefore, the pixel number estimated by the extracting unit 25c becomes ¼ as compared with the first embodiment, for example. Hence, since the number of determinations of the light displaying-portion region is reduced, this is suitable for high speed processing. A memory capacity of the memory 26 for processing may be reduced.

It should be apparent to those skilled in the art that the present invention may be embodied in many other specific forms without departing from the spirit or scope of the invention. Particularly, it should be understood that the present invention may be embodied in the following forms.

In the above-described embodiments, RGB format image data may be output instead of the YCbCr format image data.

YCbCr format image data may be output instead of the RGB format image data. Image data of other format such as YUV may be output.

Of the input pixels and pixels which are read out from the memory, each of the synthesizers may select a bright pixel and may generate an output frame including the selected pixel. For example, in the case of YCbCr format pixel data, a brightness component Y of an input pixel is compared with a brightness component Y of a pixel which is read out from the memory, and an output frame including a value of the greater brightness component Y is generated.

In the embodiments, when a previous pixel is a non-light-displaying-portion region and an input pixel color is a signal color, the input pixel is estimated as a top pixel of a light displaying-portion region, but the condition may be changed. For example, when the color is a signal color or an achromatic color, the input pixel is estimated as a light displaying-portion region. When the color is a signal color or a saturation color, the input pixel is estimated as a light displaying-portion region. When the color is any one of a signal color, an achromatic color and a saturation color, an input pixel is estimated as a light displaying-portion region.

In the embodiments, partial image data stored in the memory 26, 26a may further be determined.

Figure 22:
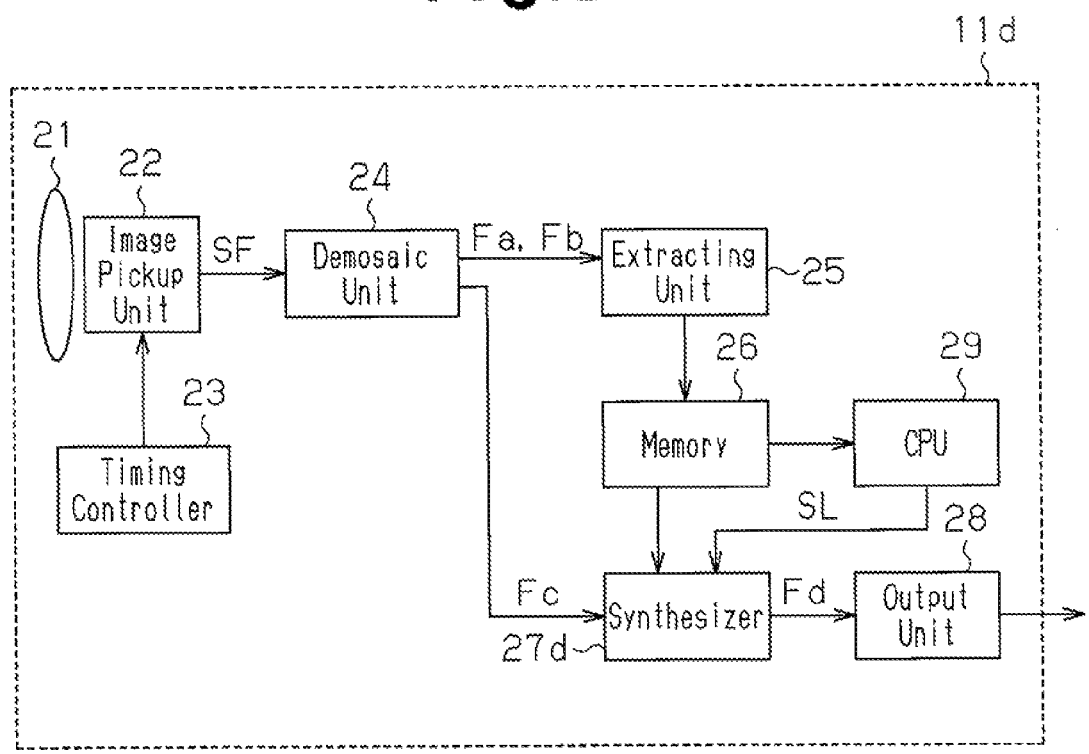
FIG. 22 is a block diagram of another image pickup apparatus.

For example, an image pickup apparatus 11d illustrated in FIG. 22 includes a CPU 29. Concerning partial image data which is read out from the memory 26, the CPU 29 determines whether an extracted pixel corresponds to a traffic light based on pixel coordinate values and pixel data of each pixel. For example, in the case of partial image data corresponding to a light displaying portion of a traffic light, a light displaying-portion region which is adjacent in a vertical direction (vertical direction in image, and direction intersecting with arrangement direction (line direction) of input pixel) is estimated. Therefore, the CPU 29 determines that a plurality of adjacent light displaying-portion regions are validated, and determines that an isolated light displaying-portion region such as one line is not validated. The CPU 29 outputs a selection signal SL corresponding to a result of determination. In replay to a selection signal SL which is output from the CPU 29, a synthesizer 27d selects whether each of extracted pixel data is synthesized. The CPU 29 is one example of a determiner which determines validity of pixel data stored in the memory 26. If the image pickup apparatus includes the CPU 29 (determiner), it is possible to determine more precisely. The CPU 29 and the synthesizer 27d illustrated in FIG. 22 may be applied in accordance with the embodiments.

In the embodiment, determination of a signal color may appropriately be changed. For example, a square sum of color difference values Cb' and Cr' included in color information of an input pixel and color difference values Cb and Cr of the set values is calculated. That is, the following equation is calculated:

$$Z=(Cb-Cb')^2+(Cr-Cr')^2$$

and it may be determined whether a pixel color is a signal color based on a result of calculation Z.

The signal color setting unit 31 may store a threshold value for determining whether a pixel color is a signal color. This threshold value may be changed.

The threshold value for determining whether a pixel color is a signal color may be set for every light displaying portion.

It is also possible to employ a configuration that a maximum value and a minimum value of a color difference CbCr which corresponds to colors of light displaying portions are set, and when color difference values Cb and Cr of an input pixel are between the maximum value and the minimum value, the input pixel may be estimated as a light displaying-portion region.

Figure 23:
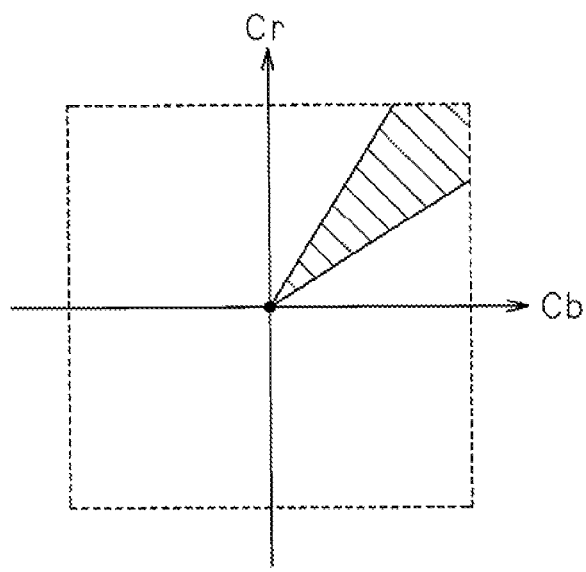
FIG. 23 is an explanatory diagram of determination set value of a signal color.

As illustrated in FIG. 23, it may be estimated whether the input pixel is a light displaying-portion region or a non-light-displaying-portion region depending whether color difference values Cb and Cr of an input pixel are included in a region sandwiched between two line segments which pass through an origin in a CbCr plane of a color difference value.

In the embodiments, pixels processed by the extracting unit may be limited.

Figure 24A:
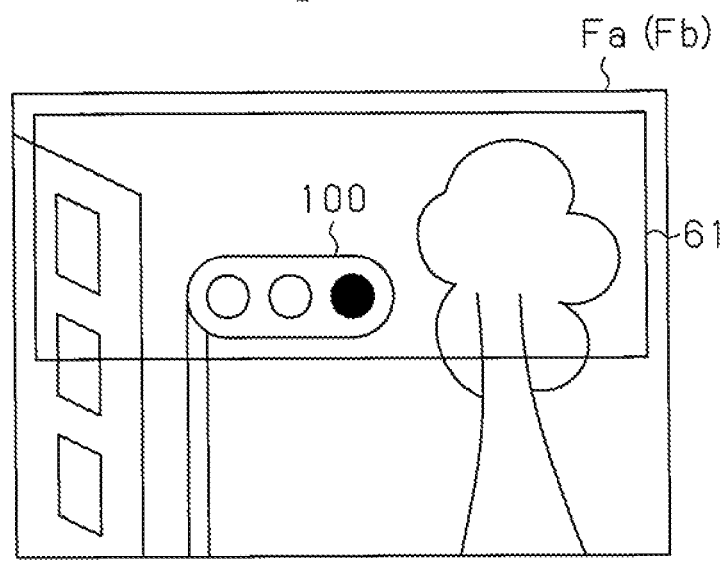
FIGS. 24A and 24B are explanatory diagrams of a region setting in an extracting unit.
Figure 24B:
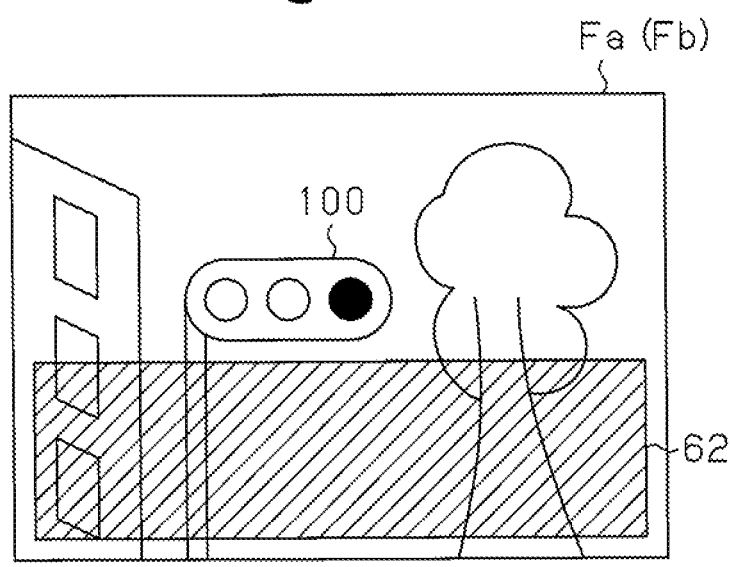

In the case of an image pickup apparatus, so-called a drive recorder provided in a vehicle for example, a traffic light 100 is included in an upper portion of a videotaped frame image. Therefore, as illustrated in FIG. 24A, a region-to-be-extracted 61 is set at an upper portion of a frame, a light displaying-portion region of pixels in the region-to-be-extracted 61 may be estimated and its validity may be determined. As illustrated in FIG. 24B, an extraction-exclusion region 62 may be set, a light displaying-portion region of pixels existing outside of the extraction-exclusion region 62 may be estimated and its validity may be determined. The regions 61 and 62 are set by a control unit (CPU) for example. By setting the regions 61 and 62 in this manner, processing of a signal color determining unit etc. is canceled in accordance with an input pixel coordinate value for example. According to this configuration, the number of times of operation of a signal color determining unit etc. included in the extracting unit is reduced as compared with a case where the regions are not set, and it is possible to reduce power consumption of the image pickup apparatus. Since pixels existing outside of the region-to-be-extracted 61 and pixels in the extraction-exclusion region 62 are not erroneously extracted as a light displaying-portion region, a capacity of the memory 26 may be reduced.

In the embodiments, the certain standard is not limited to the NTSC standard, and the certain standard may be a standard other than the NTSC standard such as PAL (Phase Alternating Line).

The number of frames per unit time is appropriately changed. The image pickup apparatus may videotape at a frame rate of integral multiple of a recording frame rate, and may generate image data.

Although one synthesis frame is generated from three frames in the embodiments, one synthesis frame may be generated from two frames or one synthesis frame may be generated from four or more frames.

The number of frames recorded for one second may appropriately be changed as 5, 6, 10, 12, 15, 20, 25 frames for example.

Although the system (so-called drive recorder) is provided in a vehicle in the embodiments, the system may be embodied as a security camera installed at a street etc.

In a fifth embodiment, like the extracting unit 25c, the synthesizer 27c may couple a plurality of pixels to one another to generate a synthesized pixel, the generated synthesized pixel and a pixel (synthesized pixel) which is read out from the memory 26 may be synthesized to generate an output frame.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image processor, comprising:
    an extracting unit that extracts partial image data corresponding to a set color from pickup image data of first to (N−1)-th frames of the first to N-th frames output from an image pickup unit within one video recording cycle, where N is an integer not less than two;
    a storage unit coupled to the extracting unit to store the extracted partial image data; and
    a synthesizer coupled to the storage unit, wherein the synthesizer synthesizes pickup image data of the N-th frame and the partial image data read from the storage unit to generate an output frame, and outputs image data of the output frame;
    wherein the extracting unit
        estimates a region-to-be-extracted based on a color of a pixel from pixels constituting the first to (N−1)-th frames and the set color,
        stores pixel values of pixels included in the estimated region-to-be-extracted in the storage unit,
        determines validity of the estimated region-to-be-extracted, and
    stores, in the storage unit, region information of the region-to-be-extracted that is determined as being validated, and
    wherein the synthesizer synthesizes the pixels of the region-to-be-extracted and the pickup image data of the N-th frame based on the region information to generate the output frame.

2. The image processor according to claim 1, wherein the synthesizer receives the pixels of the region-to-be-extracted from the storage unit and receives the pickup image data of the N-th frame without via the extracting unit.

3. The image processor according to claim 1, wherein the output frame generated by the synthesizer is a representative of pickup image data of the first to N-th frames output from the image pickup unit within one video recording cycle.

4. The image processor according to claim 3, wherein the synthesizer outputs the output frame but does not output each of the first to N-th frames.

5. The image processor according to claim 1, wherein the extracting unit includes
    a first determining unit that determines whether a color of an input pixel is the same as the set color, and outputs a code corresponding to a result of determination,
    a second determining unit that determines whether the color of the input pixel is an achromatic color or a saturation color, and outputs a code corresponding to a result of determination, and
    a determination output unit that estimates a region-to-be-extracted based on the code output from the first determining unit and the code output from the second determining unit, stores, in the storage unit, pixel values of pixels included in the region-to-be-extracted, determines validity of the region-to-be-extracted, and stores, in the storage unit, region information of the region-to-be-extracted in accordance with a result of determination.

6. The image processor according to claim 5, wherein the determination output unit includes
    a first counter that counts pixels that are determined as being included in the region-to-be-extracted, and
    a second counter that counts pixels having the same color as that of the set color, and wherein the determination output unit determines validity of the region-to-be-extracted based on a count value of the first counter and a count value of the second counter.

7. The image processor according to claim 5, wherein the region information includes a top coordinate value of the region-to-be-extracted and a number of pixels included in the region-to-be-extracted.

8. The image processor according to claim 5, wherein when a color of an m-th pixel is equal to the set color but a color of an (m−1)-th pixel is a color other than the set color, the determination output unit estimates the m-th pixel is a top of the region-to-be-extracted, and stores a pixel value of the m-th pixel in the storage unit, where m is an integer not less than two, when the color of the m-th pixel is any of the set color, the achromatic color and the saturation color and the (m−1)-th pixel is included in the region-to-be-extracted, the determination output unit determines that the m-th pixel is included in the region-to-be-extracted, and stores a pixel value of the m-th pixel in the storage unit, and when the color of the m-th pixel is not any of the set color, the achromatic color and the saturation color and the (m−1)-th pixel is included in the region-to-be-extracted, the determination output unit estimates the m-th pixel is a non-subject region, and determines validity of the region-to-be-extracted, and if the determination output unit determines that the region-to-be-extracted is validated, the determination output unit stores region information of the region-to-be-extracted in the storage unit.

9. The image processor according to claim 8, wherein when the color of the m-th pixel is any of the set color, the achromatic color and the saturation color and the (m−1)-th pixel is the non-subject region, the determination output unit estimates the m-th pixel is a top of the region-to-be-extracted.

10. The image processor according to claim 8, wherein the set color includes a plurality of signal colors of a plurality of light displaying portions of a traffic light, the determination output unit stores, in a register, a color of a pixel that is estimated as being a top of the region-to-be-extracted, when the color of the m-th pixel is any of the color stored in the register, the achromatic color and the saturation color, the determination output unit stores a pixel value of the m-th pixel in the storage unit, and when the color of the m-th pixel is not any of the color stored in the register, the achromatic color and the saturation color, the determination output unit determines that the m-th pixel is a non-subject region.

11. The image processor according to claim 8, wherein a pixel of each frame which is output from the image pickup unit includes one color information corresponding to a color filter of the image pickup unit, the image processor includes a demosaic unit, the demosaic unit generates color information which is insufficient for each pixel based on color information of a pixel existing around that pixel, and the demosaic unit generates a pixel value including a plurality of color information, and the extracting unit and the synthesizer execute corresponding processing based on the pixel value of the pixel which is output from the demosaic unit.

12. The image processor according to claim 8, wherein a pixel of each frame which is output from the image pickup unit includes one color information corresponding to a color filter of the image pickup unit, the extracting unit includes a coupling portion which couples a plurality of pixels including different color information to each other to generate one synthesized pixel, the extracting unit stores, in the storage unit, a pixel value of a synthesized pixel of the region-to-be-extracted estimated based on a color of the synthesized pixel, and with respect to the pixel including the one color information, the synthesizer synthesizes the color information of the pixel and a color component corresponding to the color of the pixel included in the synthesized pixel which is read out from the storage unit.

13. The image processor according to claim 8, wherein the determination output unit provides the storage unit with the pixel value and a write address at which the pixel value is written, when the m-th pixel is estimated as a top of the region-to-be-extracted, the determination output unit stores the write address in a register as a write address region top address at which the pixel value is written in the storage unit, and when the determination output unit determines that the region-to-be-extracted is not validated, the determination output unit sets, as the write address, the region top address which is read out from the register.

14. An image pickup apparatus, comprising:

an image pickup unit that outputs pickup image data of first to N-th frames within one video recording cycle, where N is an integer not less than two;

an extracting unit that extracts partial image data corresponding to a set color from pickup image data of the first to (N−1)-th frames;

a storage unit coupled to the extracting unit to store the extracted partial image data; and a synthesizer coupled to the storage unit, wherein the synthesizer synthesizes the pickup image data of the N-th frame and the partial image data read from the storage unit to generate an output frame, and outputs image data of the output frame;

wherein the extracting unit estimates a region-to-be-extracted based on a color of each pixel from pixels constituting the first to (N−1)-th frames and the set color, stores pixel values of pixels included in the estimated region-to-be-extracted in the storage unit, determines validity of the region-to-be-extracted, and stores, in the storage unit, region information of the region-to-be-extracted which is determined as being validated, and wherein the synthesizer synthesizes the pixels of the region-to-be-extracted and pickup image data of the N-th frame based on the region information to generate the output frame.

15. An image pickup system, comprising:

an image pickup apparatus that outputs image data of one frame every video recording cycle, and a recording apparatus that records the image data of each frame output form the image pickup apparatus, wherein the image pickup apparatus includes:

an extracting unit that extracts partial image data corresponding to a set color from pickup image data of first to (N−1)-th frames of the first to N-th frames output from an image pickup unit within one video recording cycle, where N is an integer not less than two;

a storage unit coupled to the extracting unit to store the extracted partial image data; and a synthesizer coupled to the storage unit, wherein the synthesizer synthesizes pickup image data of the N-th frame and the partial image data read from the storage unit to generate an output frame, and outputs image data of the output frame;

wherein the extracting unit
- estimates a region-to-be-extracted based on a color of each pixel from pixels constituting the first to (N−1)-th frames and the set color,
- stores pixel values of pixels included in the estimated region-to-be-extracted in the storage unit,
- determines validity of the estimated region-to-be-extracted, and
- stores, in the storage unit, region information of the region-to-be-extracted that is determined as being validated, and wherein the synthesizer synthesizes the pixels of the region-to-be-extracted and the pickup image data of the N-frame based on the region information to generate the output frame.

16. A data processing method, comprising:

estimating a region-to-be-extracted based on a set color and a color of each pixel from pickup image data of first to (N−1)-th frames of the first to N-th frames output from an image pickup unit within one video recording cycle, where N is an integer not less than two;

storing in a storage unit pixel values of pixels included in the estimated region-to-be-extracted;

determining validity of the region-to-be-extracted;

storing, in the storage unit, region information of the region-to-be-extracted which is determined as being validated;

synthesizing pixels of the region-to-be-extracted and the pickup image data of the N-th frame based on the region information to generate an output frame corresponding to pickup image data of the first to N-th frames.

* * * * *